(12) United States Patent
Kerstetter, III et al.

(10) Patent No.: US 10,279,527 B2
(45) Date of Patent: May 7, 2019

(54) THERMOPLASTIC VULCANIZATES COMPRISING PROPYLENE-BASED ELASTOMERS AND METHODS FOR MAKING THE SAME

(71) Applicant: ExxonMobil Chemical Patents Inc., Baytown, TX (US)

(72) Inventors: Randal H. Kerstetter, III, Wadsworth, OH (US); Porter C. Shannon, Seabrook, TX (US); Joseph M. Tomei, Akron, OH (US); Eugene R. Uhl, Massillon, OH (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 299 days.

(21) Appl. No.: 15/099,916

(22) Filed: Apr. 15, 2016

(65) Prior Publication Data

US 2016/0340480 A1 Nov. 24, 2016

Related U.S. Application Data

(60) Provisional application No. 62/165,386, filed on May 22, 2015.

(51) Int. Cl.
| | |
|---|---|
| *B29C 35/02* | (2006.01) |
| *C08J 3/24* | (2006.01) |
| *B29C 47/00* | (2006.01) |
| *C08L 23/16* | (2006.01) |
| *C08L 23/08* | (2006.01) |

(Continued)

(52) U.S. Cl.
CPC .......... *B29C 47/0004* (2013.01); *B29C 35/02* (2013.01); *C08J 3/24* (2013.01); *C08L 23/0815* (2013.01); *C08L 23/16* (2013.01); *B29K 2021/003* (2013.01); *B29K 2023/16* (2013.01); *B29L 2031/00* (2013.01); *C08J 2323/16* (2013.01); *C08J 2423/12* (2013.01); *C08J 2423/16* (2013.01)

(58) Field of Classification Search
CPC ......... C08J 3/24; B29C 47/0004; B29C 35/02
See application file for complete search history.

(56) References Cited

U.S. PATENT DOCUMENTS

| | | | |
|---|---|---|---|
| 6,111,021 A | * | 8/2000 | Nakahama ............... C08L 23/02 525/232 |
| 6,245,856 B1 | | 6/2001 | Kaufman et al. |

(Continued)

FOREIGN PATENT DOCUMENTS

| | | |
|---|---|---|
| EP | 1 655 332 | 12/2008 |
| JP | 2014181266 | 9/2014 |

(Continued)

OTHER PUBLICATIONS

Machine Translation of JP2014-181266 (Year: 2014).*

*Primary Examiner* — Christopher T Schatz

(57) ABSTRACT

Described herein are thermoplastic vulcanizates comprising propylene-based elastomers and methods for producing the same. The thermoplastic vulcanizates comprise rubber, at least 10 wt % of thermoplastic resin, from 1 to 9 wt % of propylene-based elastomer, oil, and at least 5 wt % of one or more fillers. The thermoplastic vulcanizates are made by a method where the propylene-based elastomer is introduced to the extrusion reactor before the curative is introduced to the extrusion reactor.

5 Claims, 10 Drawing Sheets

Example 4 - Haake Capillary Extrusion Pressure

(51) Int. Cl.
*B29K 21/00* (2006.01)
*B29K 23/00* (2006.01)
*B29L 31/00* (2006.01)

(56) References Cited

U.S. PATENT DOCUMENTS

| | | |
|---|---|---|
| 6,268,438 B1 | 7/2001 | Ellul et al. |
| 6,288,171 B2 | 9/2001 | Finerman et al. |
| 6,399,710 B1 | 6/2002 | Finerman et al. |
| 6,713,520 B2 | 3/2004 | Sahnoune et al. |
| 7,008,699 B2 | 3/2006 | Jourdian et al. |
| 7,294,675 B2 | 11/2007 | Hoyweghen et al. |
| 7,319,121 B2 | 1/2008 | Jacob |
| 7,326,471 B2 | 2/2008 | Shaw |
| 7,964,672 B2 | 6/2011 | Ouhadi |
| 8,241,753 B2 | 8/2012 | Kenens et al. |
| 2007/0129493 A1 | 6/2007 | Sahnoune et al. |

FOREIGN PATENT DOCUMENTS

| | | |
|---|---|---|
| WO | 99/27001 | 6/1999 |
| WO | 2015/095987 | 7/2015 |

* cited by examiner ately vulcanized with the curative in the presence of the thermoplastic resin and the propylene-based elastomer to form the thermoplastic vulcanizate that has a
THERMOPLASTIC VULCANIZATES COMPRISING PROPYLENE-BASED ELASTOMERS AND METHODS FOR MAKING THE SAME

PRIORITY

This invention claims priority to and the benefit of U.S. Ser. No. 62/165,386, filed on May 22, 2015.

FIELD OF THE INVENTION

Described herein are thermoplastic vulcanizates comprising propylene-based elastomers and methods for making the same.

BACKGROUND OF THE INVENTION

Thermoplastic vulcanizates ("TPVs") are vulcanized compositions that include finely dispersed crosslinked elastomeric particles in a continuous thermoplastic phase. TPVs are produced by a process called dynamic vulcanization where the elastomeric component is selectively crosslinked during melt mixing with molten thermoplastics. TPVs have the benefits of the elastomeric properties provided by the elastomer phase and the processability provided by the thermoplastic phase.

Conventional plastic processing equipment can extrude, inject, or otherwise mold, and thus press and shape TPV compositions into useful products alone or in composite structures with other materials. The presence of the dynamically vulcanized, cross-linked rubber particles in TPVs, however, can make these TPVs difficult to process. As a result, the presence of flow marks on the surface of injection molded articles and the presence of surface imperfections on extruded profiles, such as hard spots, die lines, or die deposits, can occur. These surface imperfections on end-use articles are even more visible with soft TPVs and often make existing TPVs unsuitable for many end-use applications, particularly end-use applications where the surface of the finished article is visible, such as extruded weather seals used in automotive applications and different articles made by injection molding, such as soft touch sealing profiles such as glass encapsulations.

Attempts have been made to produce TPVs with improved properties that include blending the TPV with a soft polymer. For example, U.S. Pat. No. 6,288,171 describes TPVs that are blended with a random propylene copolymer in a two-step process and U.S. Pat. No. 7,008,699 describes composite structures where the TPV in the second polymer structure may be optionally blended with a semi-crystalline random adhesive copolymer in a two-step process.

Additional attempts have been made to produce TPVs with improved properties by incorporating a second polymer component in the thermoplastic phase of the TPV. For example, U.S. Pat. No. 7,294,675 describes TPVs, where the thermoplastic component comprises greater than 80 wt % of a random propylene copolymer having a melting point of less than 105° C. For example, U.S. Pat. No. 7,326,471 exemplifies TPVs that include 10 to 40 wt % of a second olefinic thermoplastic resin component that has 60 wt % or more units derived from propylene, isotactically arranged propylene derived sequences, and a heat of fusion less than 45 J/g. For example, Japanese Patent Application Publication No. 2014-181266 describes a thermoplastic elastomer composition containing an olefinic rubber (A), an olefinic resin (B) having a melting point of 70 to 200° C., and a propylene-α-olefin random copolymer (C) having a propylene content of 70-90 mol %, a Mw/Mn of less than 3.5, and a melting point of less than 70° C.

Further attempts have been made to produce TPVs with improved properties by using an ultra-fine dispersion of the elastomeric phase within the thermoplastic phase. For example, U.S. Pat. No. 7,829,623 is directed to a method for preparing TPV compositions comprising providing into melt processing equipment (i) from 5 to 10 wt % of at least one thermoplastic polypropylene, (ii) from 6 to 12 wt % of at least one propylene copolymer, and (iii) from 15 to 35 wt % of at least one cross-linkable rubber, where the dispersed, cross-linked phase of the TPV consists of particles having an effective diameter of not greater than 2 millimicrons.

Additional background references include U.S. Pat. Nos. 6,245,856; 6,268,438; 6,399,710; 6,713,520; 7,319,121; 7,964,672; and 8,241,753; U.S. Patent Application Publication No. 2007/0129493; European Patent No. 1655332B1; PCT Publication No. WO 99/27001; and PCT Application No. PCT/CN2013/001634.

Despite these prior attempts, there is still a need for TPVs that have improved processability without sacrificing the mechanical properties of the TPV and that can be used to produce end-use applications that have good surface appearance.

SUMMARY OF THE INVENTION

Figure 1:
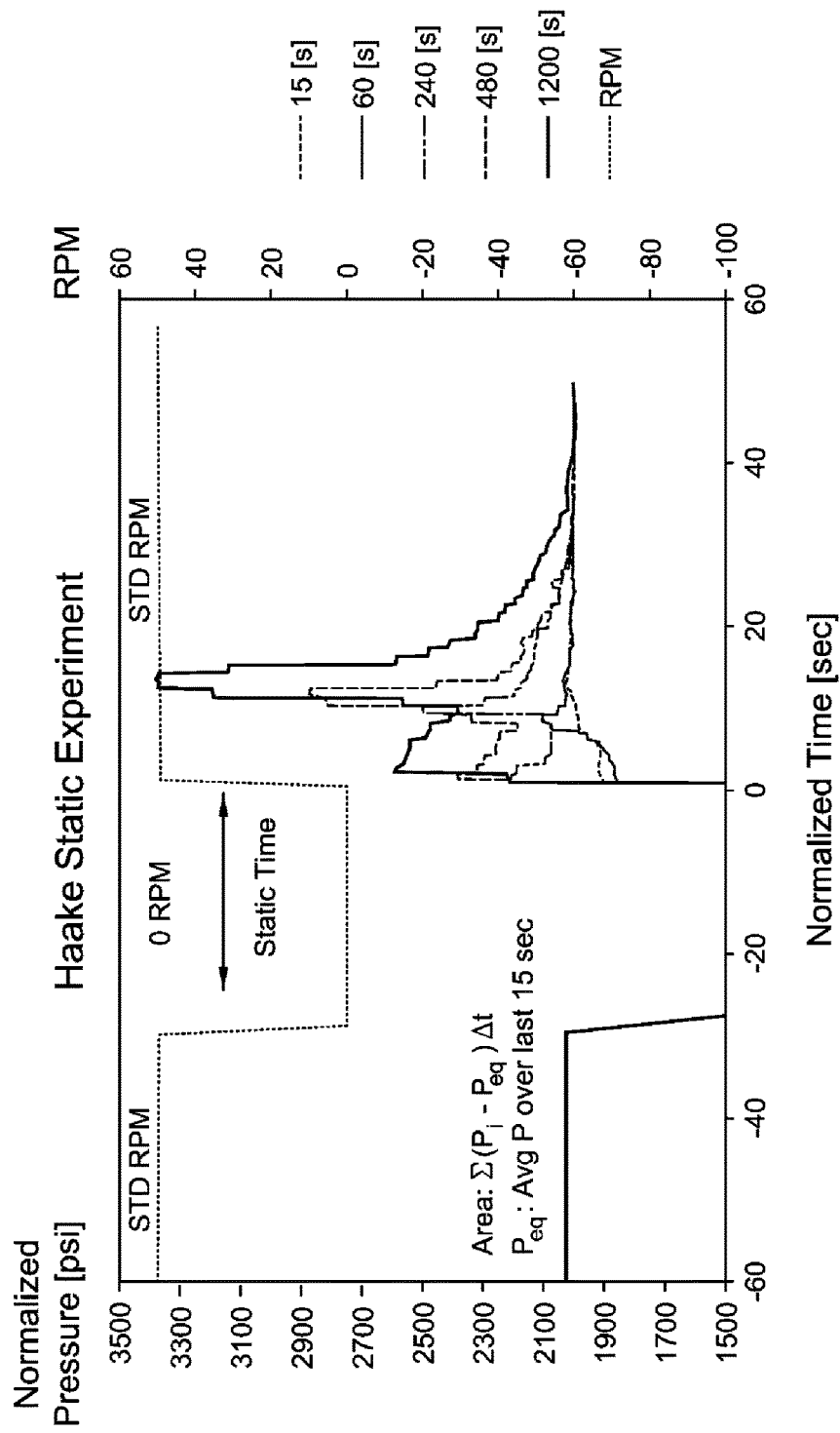
FIG. 1 illustrates the process for the Haake Static Experiment.

Provided herein are thermoplastic vulcanizates comprising propylene-based elastomers and methods for producing the same.

The method for producing the thermoplastic vulcanizate may comprise introducing rubber, at least 10 wt % of thermoplastic resin, from 1 to 9 wt % of propylene-based elastomer, at least 5 wt % of one or more fillers, oil, and curative to an extrusion reactor. The oil may be introduced to the extrusion reactor in at least two parts, where a first amount of process oil is introduced to the extrusion reactor at a first oil injection location, and a second amount of process oil is introduced to the extrusion reactor at a second oil injection location that is downstream of the location where the curative is introduced to the extrusion reactor. The curative may be introduced to the extrusion reactor at a location that is downstream of the first oil injection location and that is downstream of the location where the propylene-based elastomer is introduced to the extrusion reactor. The rubber is dynamically vulcanized with the curative in the presence of the thermoplastic resin and the propylene-based elastomer to form the thermoplastic vulcanizate that has a rubber phase that is dispersed and at least partially cross-linked within a continuous thermoplastic component that comprises the thermoplastic resin and the propylene-based elastomer.

The TPVs described herein comprise (i) rubber, (ii) thermoplastic resin, (iii) PBE, (iv) oil, and (v) filler(s). Preferably, the TPV comprises at least 10 wt % of thermoplastic resin, from 1 to 9 wt % of PBE, and at least 5 wt % of one or more fillers. In some embodiments, the thermoplastic resin comprises a fractional polypropylene and a second polypropylene having a melt flow rate higher than the melt flow rate of the fractional polypropylene. In some embodiments, the thermoplastic resin comprises a fractional polypropylene having a melt flow rate of less than 2 g/10 min, a second polypropylene having a melt flow rate of from about 25 to about 45 g/10 min, and a third polypropylene having a melt flow rate of from about 5 to about 30 g/10 min, where the second and third polypropylenes are different.

The thermoplastic vulcanizates that comprise propylene-based elastomers may exhibit improved surface quality and extrusion processability (e.g., extrusion pressure and specific throughput) as compared to thermoplastic vulcanizates that do not contain propylene-based elastomers. Surprisingly, these benefits may be achieved without significantly affecting the Shore A hardness or the LCR viscosity of the TPV. In some embodiments, the thermoplastic vulcanizate has a Shore A hardness of from 60 to 75 and an ultimate elongation of greater than 420%. In some embodiments, the thermoplastic vulcanizate has a Shore A hardness of from 75 to 90 and an ultimate elongation of greater than 400%.

DETAILED DESCRIPTION OF THE INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, a "thermoplastic vulcanizate" or "TPV" is broadly defined as any material that includes a dispersed, at least partially vulcanized or fully vulcanized, rubber within a thermoplastic resin. A TPV composition can further include oil, additives, and combinations thereof.

As used herein, the term "vulcanizate" means a composition that includes some component (e.g., rubber) that has been vulcanized. The term "vulcanized" is defined herein in its broadest sense, and refers in general to the state of a composition after all or a portion of the composition (e.g., crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." In at least that context, the term vulcanization encompasses any form of curing (crosslinking), both thermal and chemical, which can be utilized in dynamic vulcanization.

As used herein, the term "dynamic vulcanization" means vulcanization or curing of a curable rubber blended with a thermoplastic resin under conditions of shear at temperatures sufficient to plasticize the mixture. In preferred embodiments, the rubber is simultaneously crosslinked and dispersed within the thermoplastic resin. Depending on the degree of cure, the rubber to thermoplastic resin ratio, compatibility of the rubber and thermoplastic resin, the kneader type and the intensity of mixing (shear rate), other morphologies, such as co-continuous rubber phases in the plastic matrix, are possible.

As used herein, a "partially vulcanized" rubber is one wherein more than 5 weight percent (wt %) of the crosslinkable rubber is extractable in boiling xylene, subsequent to vulcanization (preferably dynamic vulcanization), e.g., crosslinking of the rubber phase of the TPV. For example, in a TPV comprising a partially vulcanized rubber at least 5 wt % and less than 20 wt %, or 30 wt %, or 50 wt % of the crosslinkable rubber can be extractable from the specimen of the TPV in boiling xylene.

Preferably, the percent of soluble rubber in the cured composition is determined by refluxing a specimen in boiling xylene, weighing the dried residue and making suitable corrections for soluble and insoluble components based upon knowledge of the composition. Thus, corrected initial and final weights are obtained by subtracting from the initial weight of the soluble components, other than the rubber to be vulcanized, such as extender oils, plasticizers, and components of the compositions soluble in organic solvent, as well as thermoplastic components that are not intended to cure. Any insoluble pigments, fillers, etc., are subtracted from both the initial and final weights. Any materials in the uncured rubber that are soluble in refluxing xylene are subtracted from the rubber when calculating the percent of soluble rubber in a cured composition. A further description of the technique for determining the percentage of extractable rubber is set forth in U.S. Pat. No. 4,311,628, and the portions of the patents referring to that technique are hereby incorporated by reference.

As used herein, a "fully vulcanized" (or fully cured or fully crosslinked) rubber is one wherein less than 5 wt % of the crosslinkable rubber is extractable in boiling xylene, subsequent to vulcanization (preferably dynamic vulcanization), e.g., crosslinking of the rubber phase of the TPV. For example, in a TPV comprising a fully vulcanized rubber less than 4 wt %, or less than 3 wt %, or less than 2 wt %, or less than 1 wt % of the crosslinkable rubber can be extractable from the specimen of the TPV in boiling xylene. In some embodiments, in a TPV comprising a fully vulcanized rubber from 0.5 to 2.0 wt % of the crosslinkable rubber can be extractable from the specimen of the TPV in boiling xylene.

As used herein "phr" means parts per hundred parts of rubber. Thus, for example, a TPV that comprises 10 phr of an additive, contains 10 parts by weight of the additive per 100 parts by weight of the rubber in the TPV.

Rubber Component

The TPVs described herein comprise a rubber component. The "rubber component" can be any material that is considered by persons skilled in the art to be a "rubber", preferably a crosslinkable rubber (i.e., prior to vulcanization) or crosslinked rubber (i.e., after vulcanization). The rubber component may comprise one rubber or may comprise blends of two or more rubbers, where the rubbers are different in composition or are the same in composition but have different properties.

Non-limiting examples of useful rubbers include olefin-containing rubbers, butyl rubber, natural rubber, styrene-butadiene copolymer rubber, butadiene rubber, acrylonitrile rubber, halogenated rubbers such as brominated and chlorinated isobutylene-isoprene copolymer rubber, butadiene-styrene-vinyl pyridine rubber, urethane rubber, polyisoprene rubber, epichlorohydrin terpolymer rubber, polychloroprene rubber, and mixtures thereof. In preferred embodiments, the rubber is an olefin-containing rubber, such as an ethylene-α-olefin copolymer rubber, such as an ethylene-α-olefin-diene rubber.

The rubber may be an ethylene-α-olefin copolymer rubber comprising an α-olefin having 3 to 8 carbon atoms, such as, for example propylene. The ethylene-α-olefin rubber may contain at least 50 wt %, or at least 55 wt %, or at least 60 wt % of ethylene-derived units based on the weight of the ethylene-α-olefin rubber, with the balance of the units being α-olefin derived.

In preferred embodiments, the rubber component comprises an ethylene-α-olefin-diene rubber. The ethylene-α-olefin-diene rubber may comprise an α-olefin having 3 to 8 carbon atoms. In preferred embodiments the α-olefin is propylene, and the rubber is an ethylene-propylene-diene rubber ("EPDM"). Preferably the diene in the ethylene-α-olefin-diene rubber is a nonconjugated diene. Suitable nonconjugated dienes include 5-ethylidene-2-norbornene ("ENB"); 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene ("DCPD"); 5-vinyl-2-norbornene ("VNB"); divinyl benzene; and combinations thereof. In some embodiments, the ethylene-α-olefin-diene rubber comprises diene-derived units derived from ENB, VNB, or combinations thereof. In preferred embodiments, the ethylene-α-olefin diene rubber consists essentially of, or consists only of, units derived from ethylene, propylene, and ENB.

The ethylene-α-olefin-diene rubber may contain at least 50 wt %, or at least 55 wt %, or at least 60 wt % ethylene-derived units, based in the weight of the ethylene-α-olefin-diene rubber. In some embodiments, the ethylene-α-olefin-diene rubber contains from 50 to 90 wt % ethylene-derived units, or from 50 to 85 wt %, or from 55 to 80 wt %, or from 55 to 75 wt %, or from 60 to 70 wt % ethylene-derived units, based on the weight of the ethylene-α-olefin-diene rubber, where desirable ranges may include ranges from any lower limit to any upper limit. The amount of ethylene-derived units in the copolymer may be determined according to ASTM D3900. In the ethylene-α-olefin-diene rubber, the diene-derived units may be present in an amount of at least 0.1 wt %, or at least 1 wt %, or at least 2 wt %, or at least 3 wt %, or at least 4 wt %, based on the weight of the ethylene-α-olefin-diene rubber. In some embodiments, the ethylene-α-olefin-diene rubber may contain from about 0.1 to about 10 wt %, or from about 1 to about 9 wt %, or from about 2 to about 8 wt %, or from about 3 to about 7 wt %, or from about 4 to about 6 wt % diene-derived units, based on the weight of the ethylene-α-olefin-diene rubber, where desirable ranges may include ranges from any lower limit to any upper limit. The wt % of diene-derived units may be determined according to ASTM D-6047. The balance of the ethylene-α-olefin-diene rubber will generally be made up of units derived from α-olefin, such as propylene. Accordingly, the ethylene-α-olefin-diene rubber may contain at least 10 wt %, or at least 15 wt %, or at least 20 wt %, or at least 25 wt %, or at least 30 wt % α-olefin derived units, based on the weight of the ethylene-α-olefin-diene rubber. In some embodiments, the ethylene-α-olefin diene rubber may contain from about 10 to about 50 wt %, or from about 15 to about 45 wt %, or from about 20 to about 40 wt %, or from about 25 to about 35 wt % α-olefin derived units, based on the weight of the ethylene-α-olefin-diene rubber, where desirable ranges may include ranges from any lower limit to any upper limit.

The ethylene-α-olefin rubber or the ethylene-α-olefin-diene rubber may have a weight average molecular weight (Mw) that is greater than 100,000 g/mole, or greater than 200,000 g/mole, or greater than 400,000 g/mole, or greater than 600,000 g/mole. The Mw of the ethylene-α-olefin rubber or the ethylene-α-olefin-diene rubber may be less than 1,200,000 g/mole, or less than 1,000,000 g/mole, or less than 900,000 g/mole, or less than 800,000 g/mole. Useful ethylene-α-olefin rubbers and ethylene-α-olefin-diene rubbers may have a number average molecular weight (Mn) that is greater than 20,000 g/mole, or greater than 60,000 g/mole, or greater than 100,000 g/mole, or greater than 150,000 g/mole. The Mn of the ethylene-α-olefin rubber or the ethylene-α-olefin-diene rubber may be less than 500,000 g/mole, or less than 400,000 g/mole, or less than 300,000 g/mole, or less than 250,000 g/mole. Techniques for determining the molecular weight ($M_n$, $M_w$, and $M_z$) and molecular weight distribution (MWD) may be found in U.S. Pat. No. 4,540,753, which is incorporated by reference herein, and references cited therein and in *Macromolecules,* 1988, volume 21, p. 3360 by Ver Strate et al., which is also herein incorporated by reference, and references cited therein.

The ethylene-α-olefin rubber or the ethylene-α-olefin-diene rubber may also be characterized by having a Mooney viscosity (ML(1+4) at 125° C.) per ASTM D-1646, of from about 10 to about 250, or from about 20 to about 100, or from about 30 to about 75, or from about 40 to about 60, where desirable ranges may include ranges from any lower limit to any upper limit. As used herein, Mooney viscosity is reported using the format: Rotor ([pre-heat time in minutes]+[shearing time in minutes] @ measurement temperature in ° C.), such that ML (1+4@125° C.) indicates a Mooney viscosity determined using the ML or large rotor according to ASTM D1646-99, for a pre-heat time of 1 minute and a shear time of 4 minutes, at a temperature of 125° C. In some embodiments, the ethylene-α-olefin rubber or the ethylene-α-olefin-diene rubber is oil extended and the Mooney viscosity of the oil-extended rubber is from about 10 to about 250, or from about 20 to about 100, or from about 30 to about 75, or from about 40 to about 60, where desirable ranges may include ranges from any lower limit to any upper limit.

The ethylene-α-olefin rubber or the ethylene-α-olefin-diene rubber may be characterized by having an intrinsic viscosity, as measured in decalin at 135° C. per ASTM D-1601, of from about 1 to about 8 dl/g, or from about 3 to about 7 dl/g, or from about 4 to about 6.5 dl/g, where desirable ranges may include ranges from any lower limit to any upper limit.

The ethylene-α-olefin rubber or the ethylene-α-olefin-diene rubber may be characterized by having a glass transition temperature ($T_g$), as determined by Differential Scanning calorimetry (DSC) according to ASTM E-1356, that is less than −20° C., or less than −30° C., or less than −50° C., or from about −20 to about −60° C.

The ethylene-α-olefin and the ethylene-α-olefin-diene rubbers described herein may be manufactured or synthesized by using a variety of techniques. For example, these copolymers can be synthesized by employing solution, slurry, or gas phase polymerization techniques that employ various catalyst systems. Exemplary catalysts include Ziegler-Natta systems such as those including vanadium catalysts, and single-site catalysts including constrained geometry catalysts, or metallocene catalysts. Useful ethylene-α-olefin rubbers and ethylene-α-olefin-diene rubbers include some grades of rubbers commercially available under the tradenames Vistalon™ (ExxonMobil Chemical Co.; Houston, Tex.), Keltan™ (DSM Copolymers), Nordel™ IP (Dow), Nordel™ MG (Dow), Royalene™ (Lion Copolymer), and Buna™ (Lanxess).

The rubber component may be present in the TPV in an amount of from a low of about 10 wt %, 15 wt %, 20 wt %, or 25 wt % to a high of about 30 wt %, 35 wt %, 40 wt %, or 45 wt % based on total weight of the TPV composition, where desirable ranges may include ranges from any lower limit to any upper limit. In some embodiments, the rubber component may consist essentially of, or consist only of, ethylene-α-olefin-diene rubber, and the TPV may contain from a low of 20 wt %, 21 wt %, 22 wt %, 23 wt %, 24 wt % or 25 wt % to a high of about 29 wt %, 30 wt %, 31, wt %, 32 wt %, 33 wt %, 34 wt %, or 35 wt % of the ethylene-α-olefin-diene rubber, based on the weight of the total TPV, where desirable ranges may include ranges from any lower limit to any upper limit.

The rubber component may be present in the TPV in an amount of from a low of about 40 wt %, 45 wt %, or 50 wt % to a high of about 65 wt %, 70, wt %, 75 wt %, based on the total weight of the polymer content of the TPV, where the polymer content consists of the rubber component, thermoplastic resin, and PBE, where desirable ranges may include ranges from any lower limit to any upper limit. In some embodiments, the rubber component may consist essentially of, or consist only of, ethylene-α-olefin-diene rubber, and the TPV may contain from a low of about 45 wt %, 46 wt %, 47 wt %, 48 wt %, 49 wt %, or 50 wt % to a high of about 63 wt %, 64 wt %, 65 wt %, 66 wt %, 67 wt %, 68 wt %, 69 wt %, or 70 wt % of ethylene-α-olefin-diene rubber, based on the total amount of ethylene-α-olefin-diene rubber, thermoplastic resin, and PBE in the TPV, where desirable ranges may include ranges from any lower limit to any upper limit.

Thermoplastic Component

The TPVs described herein comprise a thermoplastic component that comprises thermoplastic resin and PBE. The thermoplastic component may be present in the TPV composition in an amount of from a low of 5 wt %, 7 wt %, 10 wt %, 12 wt %, or 15 wt %, to a high of about 23 wt %, 25 wt %, 27 wt %, 30 wt %, or 35 wt %, based on total weight of the TPV composition, where desirable ranges may include ranges from any lower limit to any upper limit. In some embodiments, the thermoplastic component may be present in the TPV composition in an amount of from a low of about 10 wt %, 11 wt %, 12 wt %, 13 wt %, 14 wt %, 15 wt %, 16 wt %, or 17, wt %, to a high of about 25 wt %, 26 wt %, 27 wt %, 28 wt %, 29 wt %, or 30 wt %, based on the weight of the TPV, where desirable ranges may include ranges from any lower limit to any upper limit.

The thermoplastic component may be present in the TPV in an amount of from a low of about 25 wt %, 30 wt %, or 35 wt % to a high of about 50 wt %, 54 wt %, or 40 wt %, based on the total weight of the polymer content of the TPV, where the polymer content consists of the rubber component and the thermoplastic component, where desirable ranges may include ranges from any lower limit to any upper limit.

As described above, the thermoplastic component comprises thermoplastic resin and PBE. In some embodiments the polymer content of the thermoplastic component consists essentially of, or consists only of thermoplastic resin and PBE.

The TPV may contain the PBE in an amount of from 1 or 2 wt % to 8 or 9 wt %, based on the weight of the TPV. In some embodiments, the TPV may contain from about 1 to 3 wt %, or 1 to 5 wt %, or 1 to 7 wt, or 1 to 9 wt %, or 3 to 5 wt %, or 3 to 7 wt %, or 3 to 9 wt %, or 5 to 7 wt % or 5 to 9 wt %, or 7 to 9 wt %, of the PBE, based on the weight of the TPV, where desirable ranges may include ranges from any lower limit to any upper limit. In some embodiments, the TPV may contain about 2 wt %, or about 4 wt %, or about 6 wt %, or about 8 wt % of the PBE, based on the weight of the TPV.

The TPV may contain the PBE in an amount of from a low of about 5 wt %, or 7 wt %, or 10 wt %, or 12 wt %, or 15 wt % to a high of about 30 wt %, or 33 wt %, or 35 wt %, or 37 wt %, or 40 wt %, or 43 wt %, or 45 wt %, based on the weight of the thermoplastic component (i.e., the thermoplastic resin and the PBE), where desirable ranges may include ranges from any lower limit to any upper limit. In some embodiments, the TPV may contain the PBE in an amount of from a low of about 8 wt %, 9 wt %, or 10 wt %, or 11 wt % to a high of about 13 wt %, or 14 wt %, or 15 wt %, 16 wt %, based on the total weight of the thermoplastic component, where desirable ranges may include ranges from any lower limit to any upper limit. In other embodiments, the TPV may contain the PBE in an amount of from a low of about 12 wt %, 13 wt %, or 14 wt %, or 15 wt % to a high of about 17 wt %, or 18 wt %, or 19 wt %, or 20 wt %, based on the total weight of the thermoplastic component, where desirable ranges may include ranges from any lower limit to any upper limit. In other embodiments, the TPV may contain the PBE in an amount of from a low of about 20 wt %, 21 wt %, or 22 wt %, to a high of about 25 wt %, or 26 wt %, or 27 wt %, based on the total weight of the thermoplastic component, where desirable ranges may include ranges from any lower limit to any upper limit. In other embodiments, the TPV may contain the PBE in an amount of from a low of about 23 wt %, 24 wt %, or 25 wt %, to a high of about 28 wt %, or 29 wt %, or 30 wt %, based on the total weight of the thermoplastic component, where desirable ranges may include ranges from any lower limit to any upper limit. In other embodiments, the TPV may contain the PBE in an amount of from a low of about 27 wt %, 28 wt %, or 29 wt %, to a high of about 32 wt %, or 33 wt %, or 34 wt %, based on the total weight of the thermoplastic component, where desirable ranges may include ranges from any lower limit to any upper limit. In other embodiments, the TPV may contain the PBE in an amount of from a low of about 30 wt %, 31 wt %, or 32 wt %, or 33 wt % to a high of about 37 wt %, or 38 wt %, or 39 wt %, based on the total weight of the thermoplastic component, where desirable ranges may include ranges from any lower limit to any upper limit. In other embodiments, the TPV may contain the PBE in an amount of from a low of about 37 wt %, 38 wt %, or 39 wt %, or 40 wt % to a high of about 45 wt %, or 46 wt %, or 47 wt %, based on the total weight of the thermoplastic component, where desirable ranges may include ranges from any lower limit to any upper limit.

The TPV may contain the thermoplastic resin in an amount of from a low of about 10 wt %, or 11 wt %, or 12 wt %, or 13 wt %, or 14 wt %, or 15 wt %, or 16 wt % to a high of about 16 wt %, or 17 wt %, or 18 wt %, or 19 wt %, or 20 wt %, or 21 wt %, or 22 wt %, or 25 wt %, based on the weight of the TPV, where desirable ranges may include ranges from any lower limit to any upper limit.

The TPV may contain thermoplastic resin in an amount of from a low of about 50 wt %, 52 wt %, 52 wt %, or 53 wt %, or 54 wt %, or 55 wt % to a high of about 85 wt %, 86 wt %, 87 wt %, or 88 wt %, or 89 wt %, or 90 wt %, based on the total weight of the thermoplastic component in the TPV, where desirable ranges may include ranges from any lower limit to any upper limit. In some embodiments, the TPV may contain thermoplastic resin in an amount of from a low of about 50 wt %, 51 wt %, 52 wt %, or 53 wt %, or 54 wt % to a high of about 58 wt %, 59 wt %, 60 wt %, or 61 wt %, based on the total weight of the thermoplastic component, where desirable ranges may include ranges from any lower limit to any upper limit. In other embodiments, the TPV may contain thermoplastic resin in an amount of from a low of about 60 wt %, 61 wt %, 62 wt %, or 63 wt %, to a high of about 65 wt %, 66 wt %, 67 wt %, or 68 wt %, based on the total weight of the thermoplastic component, where desirable ranges may include ranges from any lower limit to any upper limit. In other embodiments, the TPV may contain thermoplastic resin in an amount of from a low of about 68 wt %, 69 wt %, 70 wt %, or 71 wt %, to a high of about 75 wt %, 76 wt %, 77 wt %, or 78 wt %, based on the total weight of the thermoplastic component, where desirable ranges may include ranges from any lower limit to any upper limit. In other embodiments, the TPV may contain thermoplastic resin in an amount of from a low of about 80 wt %, 81 wt %, 82 wt %, or 83 wt %, to a high of about 85 wt %, 86 wt %, 87 wt %, or 88 wt %, or 89 wt %, or 90 wt % based on the total weight of the thermoplastic component, where desirable ranges may include ranges from any lower limit to any upper limit.

Thermoplastic Resin

The thermoplastic component of the TPV includes at least one olefinic thermoplastic resin. The "olefinic thermoplastic resin" may be any material that is not a "rubber" and is not a "propylene-based elastomer" as described herein. For example, the thermoplastic resin may be a polymer or polymer blend considered by persons skilled in the art as being thermoplastic in nature, e.g., a polymer that softens when exposed to heat and returns to its original condition when cooled to room temperature. The olefinic thermoplastic resin component may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers.

Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof, and copolymers thereof. Preferably, the olefinic thermoplastic resin is unvulcanized or non cross-linked.

In preferred embodiments, the olefinic thermoplastic resin comprises, or consists of, polypropylene. The term "polypropylene" as used herein broadly means any polymer that is considered a "polypropylene" by persons skilled in the art and includes homo, impact, and random copolymers of propylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ α-olefins.

The olefinic thermoplastic resin may have a melting temperature of from at least 110° C., or at least 120° C., or at least 130° C., and may range from 110° C. to 170° C. or higher as measured by DSC.

The thermoplastic resin may have a melt flow rate "MFR" as measured by ASTM D1238 at 230° C. and 2.16 kg weight of from about 0.1 to 100 g/10 min. In preferred embodiments, the TPV comprises at least one thermoplastic resin having a fractional MFR, such a polypropylene having a fractional MFR of less than about 2 g/10 min, or less than about 1.5 g/10 min, or less than about 1 g/10 min. The TPV may also comprise a thermoplastic resin, such as a polypropylene, having a MFR of from a low of about 25, 26, 27, 28, 29, 30, 31, 32, or 33 g/10 min to a high of about 37, 38, 39, 40, 41, 42, 43, 44, or 45 g/10 min, where desirable ranges may include ranges from any lower limit to any upper limit. In some embodiments, the TPV may further comprise a thermoplastic resin, such as a polypropylene, having a MFR of from a low of about 5, 10, or 15 g/10 min to a high of about 20, 25, or 30 g/10 min, where desirable ranges may include ranges from any lower limit to any upper limit.

In some embodiments, the thermoplastic component of the TPV comprises, consists essentially of, or consists of a PBE, fractional polypropylene, and a second polypropylene having a higher MFR than the fractional polypropylene. In such embodiments, the fractional polypropylene may be present in the TPV in an amount of from a low of about 5 wt %, or 6 wt %, or 7 wt %, to a high of about 10 wt %, or 11 wt %, or 12 wt %, based on the weight of the TPV, where desirable ranges may include ranges from any lower limit to any upper limit. For example, the fractional polypropylene may be present in the TPV in an amount of from a low of about 35 wt %, 37 wt %, 38 wt %, 39 wt %, 40 wt %, 41 wt %, or 42 wt % to a high of about 62 wt %, 63 wt %, 64 wt %, 65 wt %, 66 wt %, or 67 wt %, based on the total weight of the thermoplastic component (i.e., the fractional polypropylene, second polypropylene, and PBE) in the TPV, where desirable ranges may include ranges from any lower limit to any upper limit. In such embodiments, the second polypropylene may be present in the TPV in an amount of from a low of about 0.5 wt %, or 1 wt %, or 1.5 wt % to a high of about 3 wt %, or 4 wt %, or 5 wt %, based on the weight of the TPV. For example, the second polypropylene may be present in the TPV in an amount of from a low of about 10 wt %, or 11 wt %, or 12 wt %, or 13 wt %, or 14 wt %, or 15 wt % to a high of about 25 wt %, or 26 wt %, or 27 wt %, or 28 wt %, or 29 wt %, or 30 wt %, based on the total weight of the thermoplastic component.

In some embodiments, the thermoplastic component of the TPV comprises, consists essentially of, or consists of PBE, fractional polypropylene, a second polypropylene having a MFR of from a low of about 25, 26, 27, 28, 29, 30, 31, 32, or 33 g/10 min to a high of about 37, 38, 39, 40, 41, 42, 43, 44, or 45 g/10 min, and a third polypropylene having a MFR of from a low about 5, 10, or 15 g/10 min to a high of about 25, 27, or 30 g/10 min. For example, the fractional polypropylene may be present in the TPV in an amount of from a low of about 5 wt %, or 6 wt %, or 7 wt % to a high of about 10 wt %, 11 wt %, or 12 wt %, based on the weight of the TPV, where desirable ranges may include ranges from any lower limit to any upper limit. For example, the fractional polypropylene may be present in the TPV in an amount of from a low of about 25 wt %, 26 wt %, 27 wt %, 28 wt %, 29 wt %, 30 wt %, 31 wt %, or 32 wt % to a high of about 46 wt %, 47 wt %, 48 wt %, 49 wt %, or 50 wt %, based on the total weight of thermoplastic component in the TPV, where desirable ranges may include ranges from any lower limit to any upper limit. For example, the fractional polypropylene may be present in the TPV in an amount of from a low of about 45 wt %, 46 wt %, 47 wt %, 48 wt %, 49 wt %, 50 wt %, or 51 wt %, to a high of about 53 wt %, 54 wt %, 55 wt %, 56 wt %, 57 wt %, 58 wt %, 59 wt %, or 60 wt %, based on the total weight of thermoplastic resin (that is based on the weight of the fractional polypropylene, the second polypropylene, and the third polypropylene) in the TPV, where desirable ranges may include ranges from any lower limit to any upper limit. The second polypropylene may be present in the TPV in an amount of from a low of about 21 wt %, 22 wt %, 23 wt %, 24 wt %, or 25 wt % to a high of about 27 wt %, 28 wt %, 29 wt %, or 30 wt %, based on the total weight of thermoplastic resin (that is based on the weight of the fractional polypropylene, the second polypropylene, and the third polypropylene) in the TPV, where desirable ranges may include ranges from any lower limit to any upper limit. The third polypropylene may be present in the TPV in an amount of from a low of about 15 wt %, 16 wt %, 17 wt %, 18 wt %, or 19 wt % to a high of about 21 wt %, or 22 wt %, or 23 wt %, or 24 wt %, or 25 wt %, based on the total weight of thermoplastic resin (that is based on the weight of the fractional polypropylene, the second polypropylene, and the third polypropylene) in the TPV, where desirable ranges may include ranges from any lower limit to any upper limit.

Propylene-Based Elastomer

The thermoplastic component of the TPVs described herein comprise one or more propylene-based polymers, such as propylene-based elastomers ("PBEs"). The PBE comprises propylene and from about 5 to about 30 wt % of one or more comonomers selected from ethylene and/or $C_4$-$C_{12}$ α-olefins. For example, the comonomer units may be derived from ethylene, butene, pentene, hexene, 4-methyl-1-pentene, octene, or decene. In preferred embodiments, the comonomer is ethylene. In some embodiments, the PBE consists essentially of propylene and ethylene, or consists only of propylene and ethylene. Some of the embodiments described below are discussed with reference to ethylene as the comonomer, but the embodiments are equally applicable to PBEs with other α-olefin comonomers. In this regard, the copolymers may simply be referred to as PBEs with reference to ethylene as the α-olefin.

The PBE may include at least about 5 wt %, at least about 6 wt %, at least about 7 wt %, at least about 8 wt %, at least about 9 wt %, or at least about 10 wt %, α-olefin-derived units, based upon the total weight of the PBE. The PBE may include up to about 25 wt %, up to about 22 wt %, up to about 20 wt %, up to about 17 wt %, up to about 15 wt %, up to about 13 wt %, or up to about 12 wt %, α-olefin-derived units, based upon the total weight of the PBE. In some embodiments, the PBE may comprise from about 5 to about 25 wt %, from about 6 to about 22 wt %, from about 7 wt % to about 20 wt %, from about 8 to about 17 wt %, from about 9 wt % to about 15 wt %, from about 9 wt % to about 13 wt %, or from about 10 to about 12 wt %, α-olefin-derived units, based upon the total weight of the PBE.

The PBE may include at least about 75 wt %, at least about 78 wt %, at least about 80 wt %, at least about 83 wt %, at least about 85 wt %, at least 87 wt %, or at least 88 wt %, propylene-derived units, based upon the total weight of the PBE. The PBE may include up to about 95 wt %, up to about 94 wt %, up to about 93 wt %, up to about 92 wt %, up to about 91 wt %, or up to about 90 wt %, propylene-derived units, based upon the total weight of the PBE.

The PBE can be characterized by a melting temperature (Tm), which can be determined by differential scanning calorimetry (DSC). Using the DSC test method described herein, the melting temperature is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 110° C., less than about 100° C., less than about 90° C., less than about 80° C., less than about 70° C., less than about 65° C., less than about 60° C. The PBE may have a Tm of from about 20 to about 90° C., from about 30 to about 80° C., from about 40 to about 70° C., or from about 50 to about 65° C., where desirable ranges may include ranges from any lower limit to any upper limit. In some embodiments, the PBE may have a Tm of from about 55 to about 70° C., or from about 57 to about 68° C., or from about 60 to about 65° C., where desirable ranges may include ranges from any lower limit to any upper limit. In some embodiments, the PBE may have a Tm of from about 45 to about 65° C., or from about 50 to about 60° C., or from about 52 to about 58° C., where desirable ranges may include ranges from any lower limit to any upper limit.

The PBE can be characterized by its heat of fusion (Hf), as determined by DSC. The PBE may have an Hf that is at least about 1.0 J/g, at least about 3.0 J/g, at least about 5.0 J/g, at least about 7.0 J/g, at least about 10.0 J/g, at least about 12 J/g, at least about 15 J/g, at least about 20 J/g, or at least about 25 J/g. The PBE may be characterized by an Hf of less than about 60 J/g, less than about 50 J/g, less than about 40 J/g, less than about 35 J/g, less than about 30 J/g, less than about 25 J/g, less than about 20 J/g, less than about 15 J/g. The PBE may have a Hf of from about 1.0 to about 50 J/g, or from about 3.0 to about 40 J/g, or from about 5.0 to about 35 J/g, or from about 10.0 to about 30 J/g, where desirable ranges may include ranges from any lower limit to any upper limit. In some embodiments, the PBE may have a Hf of from about 1.0 to about 25 J/g, from about 5.0 to about 20 J/g, from about 10 to 20 J/g, or from about 12 to about 18 J/g, where desirable ranges may include ranges from any lower limit to any upper limit. In some embodiments, the PBE may have a Hf of from 5.0 to about 40 J/g, from about 10.0 to about 35 J/g, from about 15 to about 35 J/g, or from about 20 to about 30 J/g, or from about 25 to about 30 J/g, where desirable ranges may include ranges from any lower limit to any upper limit.

As used herein, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is again cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%, where desirable ranges may include ranges from any lower limit to any upper limit. Triad tacticity may be determined by the methods described in U.S. Pat. No. 7,232,871.

The PBE may have a percent crystallinity determined according to DSC procedures of from about 0.5% to about 40%, from about 1% to about 30%, or from about 5% to about 25%, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE has a density of from about 0.84 g/cm$^3$ to about 0.92 g/cm$^3$, from about 0.85 g/cm$^3$ to about 0.90 g/cm$^3$, or from about 0.86 g/cm$^3$ to about 0.88 g/cm$^3$ at room temperature, as measured per the ASTM D-1505 test method, where desirable ranges may include ranges from any lower limit to any upper limit.

The PBE can have a melt index (MI) (ASTM D-1238, 2.16 kg @ 190° C.), of less than or equal to about 25 g/10 min, less than or equal to about 10 g/10 min, less than or equal to about 8.0 g/10 min, less than or equal to about 5.0 g/10 min, or less than or equal to about 2.0 g/10 min. In some embodiments, the PBE has a MI of from about 0.5 to about 3.0 g/10 min or from about 0.75 to about 2.0 g/10 min, where desirable ranges may include ranges from any lower limit to any upper limit. In some embodiments, the PBE has a MI of from about 1.0 to about 8.0 g/10 min, or from about 2.0 to about 6.0 g/10 min, or from about 2.5 to about 5.0 g/10 min, where desirable ranges may include ranges from any lower limit to any upper limit.

The PBE may have a melt flow rate (MFR), as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min. The PBE may have an MFR less than about 25 g/10 min, less than about 15 g/10 min, less than about 10 g/10 min, less than about 7 g/10 min, or less than about 5 g/10 min. The PBE may have an MFR from about 0.5 to about 15 g/10 min, from about 1.0 to about 10 g/10 min, or from about 1.5 to about 9 g/10 min, where desirable ranges may include ranges from any lower limit to any upper limit. In some embodiments, the PBE may have a MFR of from about 2.5 to about 12 g/10 min, or from about 5.0 to about 10 g/10 min, where desirable ranges may include ranges from any lower limit to any upper limit. In some embodiments, the PBE may have a MFR of from about 0.5 to about 7.0 g/10 min, or from about 1.0 to about 6.0 g/10 min, or from about 2.0 to about 5.0 g/10 min, where desirable ranges may include ranges from any lower limit to any upper limit.

The PBE may have a weight average molecular weight (Mw), as measured by MALLS, of from about 50,000 to about 1,000,000 g/mol, or from about 75,000 to about 500,000 g/mol, from about 100,000 to about 350,000 g/mol, from about 125,000 to about 300,000 g/mol, from about 175,000 to about 275,000 g/mol, where desirable ranges may include ranges from any lower limit to any upper limit. In some embodiments, the PBE may have a Mw of from about 175,000 to about 220,000 g/mol, or from about 180,000 to about 210,000 g/mol, where desirable ranges may include ranges from any lower limit to any upper limit. In some embodiments, the PBE may have a Mw of from about 240,000 to about 300,000 g/mol, or from about 250,000 to about 280,000 g/mol, or from about 260,000 to about 270,000 g/mol, where desirable ranges may include ranges from any lower limit to any upper limit.

The PBE may have a number average molecular weight (Mn), as measured by DRI, of from about 5,000 to about 500,000 g/mol, from about 10,000 to about 300,000 g/mol, from about 50,000 to about 250,000 g/mol, from about 75,000 to about 200,000 g/mol, or from about 90,000 to about 150,000 g/mol, where desirable ranges may include ranges from any lower limit to any upper limit. In some embodiments, the PBE may have a Mn of from about 80,000 to about 110,000 g/mol, from about 85,000 to about 105,000 g/mol, or from about 90,000 to about 100,000 g/mol, where desirable ranges may include ranges from any lower limit to any upper limit. In some embodiments, the PBE may have a Mn of from about 110,000 to about 140,000 g/mol, from about 115,000 to about 135,000 g/mol, or from about 120,000 to about 130,000 g/mol, where desirable ranges may include ranges from any lower limit to any upper limit.

The PBE may have a z-average molecular weight (Mz), as measured by MALLS, of from about 50,000 to about 1,000,000 g/mol, from about 75,000 to about 500,000 g/mol, from about 100,000 to about 475,000 g/mol, from about 200,000 to about 400,000 g/mol, or from about 250,000 to about 400,000 g/mol, where desirable ranges may include ranges from any lower limit to any upper limit. In some embodiments, the PBE may have a Mz of from about 270,000 to about 310,000 g/mol, from about 275,000 to about 300,000 g/mol, or from about 280,000 to about 295,000 g/mol, where desirable ranges may include ranges from any lower limit to any upper limit. In some embodiments, the PBE may have a Mz of from about 370,000 to about 420,000 g/mol, from about 380,000 to about 410,000 g/mol, or from about 385,000 to about 400,000 g/mol, where desirable ranges may include ranges from any lower limit to any upper limit.

The molecular weight distribution (MWD, equal to Mw/Mn) of the PBE may be from about 0.5 to about 20, from about 0.75 to about 10, from about 1.0 to about 5, from about 1.5 to about 4, or from about 1.8 to about 3, where desirable ranges may include ranges from any lower limit to any upper limit.

The PBE may have a Shore D hardness of less than about less than about 50, or less than about 45, or less than about 40, or less than about 35. The PBE may have a Shore D hardness of from about 10 to about 50, or from about 15 to about 45, or from about 20 to about 40, or from about 25 to about 35, where desirable ranges may include ranges from any lower limit to any upper limit.

The PBE may have a Mooney viscosity (ML (1+4)@125° C.) of from a low of about 5, 7, or 10 to a high of about 30, 35, or 40. In some embodiments, the PBE has a Mooney viscosity of from about 5 to about 20, or from about 7 to about 18, or from about 10 to about 15, where desirable ranges may include ranges from any lower limit to any upper limit. In some embodiments, the PBE has a Mooney viscosity of from about 10 to about 40, or from about 15 to about 37, or from about 20 to about 35, or from about 25 to about 30, where desirable ranges may include ranges from any lower limit to any upper limit.

In some embodiments, the TPV contains a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 55 to about 70° C., or from about 57 to about 68° C., or from about 60 to about 65° C.; (ii) a Hf of from 5.0 to about 40 J/g, from about 10.0 to about 35 J/g, from about 15 to about 35 J/g, or from about 20 to about 30 J/g, or from about 25 to about 30 J/g; (iii) a MI of from about 1.0 to about 8.0 g/10 min, or from about 2.0 to about 6.0 g/10 min, or from about 2.5 to about 5.0 g/10 min; (iv) a MFR of from about 2.5 to about 12 g/10 min, or form about 5.0 to about 10 g/10 min; (v) a Mw of from about 175,000 to about 220,000 g/mol, or from about 180,000 to about 210,000 g/mol; (vi) a Mn of from about 80,000 to about 110,000 g/mol, from about 85,000 to about 105,000 g/mol, or from about 90,000 to about 100,000 g/mol; (vii) a Mz of from about 270,000 to about 310,000 g/mol, from about 275,000 to about 300,000 g/mol, or from about 280,000 to about 295,000 g/mol; and/or (viii) a Mooney viscosity of from about 5 to about 20, or from about 7 to about 18, or from about 10 to about 15.

In some embodiments, the TPV contains a PBE that is a propylene-ethylene copolymer that has from about 9 wt % to about 15 wt % or from about 10 to about 12 wt %, ethylene-derived units and has at least three, or at least four, or at least five, or at least six, or at least seven, or all eight of the following properties (i) a Tm of from about 45 to about 65° C., or from about 50 to about 60° C., or from about 52 to about 58° C.; (ii) a Hf of from about 1.0 to about 25 J/g, from about 5.0 to about 20 J/g, from about 10 to 20 J/g, or from about 12 to about 18 J/g; (iii) a MI of from about 0.5 to about 3.0 g/10 min or from about 0.75 to about 2.0 g/10 min; (iv) a MFR of from about 0.5 to about 7.0 g/10 min, or from about 1.0 to about 6.0 g/10 min, or from about 2.0 to about 5.0 g/10 min; (v) a Mw of from about 240,000 to about 300,000 g/mol, or from about 250,000 to about 280,000 g/mol, or from about 260,000 to about 270,000 g/mol; (vi) a Mn of from about 110,000 to about 140,000 g/mol, from about 115,000 to about 135,000 g/mol, or from about 120,000 to about 130,000 g/mol; (vii) a Mz of from about 370,000 to about 420,000 g/mol, from about 380,000 to about 410,000 g/mol, or from about 385,000 to about 400,000 g/mol; and/or (viii) a Mooney viscosity of from about 10 to about 40, or from about 15 to about 37, or from about 20 to about 35, or from about 25 to about 30.

Optionally, the PBE may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). In some embodiments, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the PBE comprises a diene, the diene may be present at from 0.05 wt % to about 6 wt %, from about 0.1 wt % to about 5.0 wt %, from about 0.25 wt % to about 3.0 wt %, from about 0.5 wt % to about 1.5 wt %, diene-derived units, based upon the total weight of the PBE.

The PBE are preferably prepared using homogeneous conditions, such as a continuous solution polymerization process. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731.

Oil

The thermoplastic vulcanizates described herein further comprise oil, such as process oils and extender oils. As used herein, process oils are oils that are added directly to the vulcanization process, as compared to extender oils which are oils that are pre-blended with the rubber to extend the rubber prior to vulcanization.

The oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene. Additive oils other than petroleum based oils can also be used, such as oils derived from coal tar and pine tar, as well as synthetic oils, e.g., polyolefin materials.

Oil can be present in the TPV in an amounts of from about 5 to about 300 parts, or from 30 to 250 parts, or from 70 to 200 parts, by weight per 100 parts by weight of total weight of the rubber component and thermoplastic component, where desirable ranges may include ranges from any lower limit to any upper limit.

In some embodiments, oil may be present in the TPV in an amount of from a low of about 10 wt %, or 15 wt %, or 20 wt %, or 25 wt %, or 30 wt %, or 31 wt %, or 32 wt %, or 33 wt %, or 34 wt %, or 35 wt %, to a high of about 40 wt %, or 41 wt %, or 42 wt %, or 43 wt %, or 44 wt %, or 45 wt %, or 50 wt %, or 55 wt %, based on the total weight of the TPV, where desirable ranges may include ranges from any lower limit to any upper limit.

Alternatively, the quantity of oil used can be defined on the basis of the amount of oil introduced to the vulcanization process before the curative is introduced ("pre-cure oil"), oil introduced with the curative, and the amount of oil introduced to the vulcanization process after the curative is introduce ("post-cure oil"). The pre-cure oil may be oil that comes from oil-extended oil and/or process-oil that is directly introduced to the vulcanization process before the curative is added. For example, in some embodiments, the amount of pre-cure oil may range from a low of about 55 wt %, or 56 wt %, or 57 wt %, or 58 wt %, or 59 wt %, or 60 wt % to a high of about 65 wt %, or 66 wt %, or 67 wt %, or 68 wt %, or 69 wt %, or 70 wt %, based on the total amount of oil in the TPV, where desirable ranges may include ranges from any lower limit to any upper limit. For example, in some embodiments, the amount of post-cure oil may range from a low of about 25 wt %, 26 wt %, 27 wt %, 28 wt %, 29 wt %, 30 wt %, or 31 wt %, to a high of about 40 wt %, or 41 wt %, or 42 wt %, or 43 wt %, or 44 wt %, or 45 wt %, or 46 wt %, based on the total amount of oil in the TPV, where desirable ranges may include ranges from any lower limit to any upper limit. For example, in some embodiments, the amount of oil introduced with the curative may range from a low of 1 wt %, or 2 wt %, or 3 wt %, or 4 wt %, to a high of about 7 wt %, or 8 wt %, or 9 wt %, or 10 wt %, based on the total amount of oil in the TPV, where desirable ranges may include ranges from any lower limit to any upper limit.

Curatives

Any curative agent that is capable of curing or crosslinking the elastomeric copolymer in the thermoplastic vulcanizate may be used. Some non-limiting examples of these curatives include phenolic resins, peroxides, and silicon-containing curatives.

In preferred embodiments, the TPV is cured using a phenolic resin vulcanizing agent. Phenolic resin curatives can also be referred to as resole resins, which are made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred in some embodiments. In some embodiments, a blend of octyl phenol and nonylphenol-formaldehyde resins are employed. The blend may include from 25 wt % to 40 wt % octyl phenol and from 75 wt % to 60 wt % nonylphenol, more preferably, the blend includes from 30 wt % to 35 wt % octyl phenol and from 70 wt % to 65 wt % nonylphenol. In some embodiments, the blend includes about 33 wt % octylphenol-formaldehyde and about 67 wt % nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which may be referred to as alkylphenol-formaldehyde resins (also available in a 30/70 weight percent paraffinic oil solution under the trade name HRJ-14247A). SP-1045 is believed to be an octylphenol-formaldehyde resin that contains methylol groups. The SP-1044 and SP-1045 resins are believed to be essentially free of halogen substituents or residual halogen compounds. By "essentially free of halogen substituents," it is meant that the synthesis of the resin provides for a non-halogenated resin that may only contain trace amounts of halogen containing compounds.

Preferred phenolic resin may have a structure according to the following general formula:

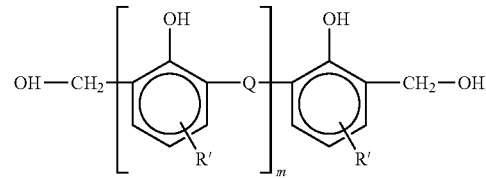

where Q is a divalent radical selected from the group consisting of —CH2- and CH2-O—CH2-; m is zero or a positive integer from 1 to 20 and R' is an alkyl group. Preferably, Q is the divalent radical —CH2-O—CH2-, m is zero or a positive integer from 1 to 10, and R' is an alkyl group having less than 20 carbon atoms. Still more preferably, m is zero or a positive integer from 1 to 5 and R is an alkyl group having between 4 and 12 carbon atoms.

The phenolic resin can be introduced into the extrusion reactor in a form of phenolic resin-in-oil ("RIO"), which means the phenolic resin is believed being dispersed and/or dissolved in a mineral oil. The mineral oil can include aromatic mineral oils, naphthenic mineral oils, and paraffinic mineral oils. The method of dispersing and/or dissolving an phenol resin in a mineral oil may be any method known in the art, for example, a method in which the phenolic resin and the mineral oil are fed at once into a glass container equipped with a stirrer and heated under stirring on a water bath of 60 to 100° C. for 1 to 10 hours, as described in U.S. Patent Application Publication No. 2013/0046049 A1.

Other examples of suitable phenolic resins include those described in U.S. Pat. No. 8,207,279 and U.S. Patent Application No. 2013/0046049 A1.

In one or more embodiments, the phenolic resin may be employed in an amount from about 2 to about 20, or from about 3 to about 15, or from about 4 to about 10 phr.

Cure Accelerator

The curative may be used in conjunction with a cure accelerator. The cure accelerator may be used to increase the degree of vulcanization of the TPV. Useful cure accelerators include metal halides, such as stannous chloride, stannous chloride anhydride, stannous chloride dehydrate, and ferric chloride. In preferred embodiments, the cure accelerator comprises anhydrous stannous chloride. The cure accelerator is introduced into the vulcanization process as part of a masterbatch as described herein.

The stannous chloride can be used in its hydrous ($SnC_2 2H_2O$) or anhydrous ($SnCl_2$) form. The stannous chloride can be used in a powdered, granulated, or flake form.

In some embodiments the cure accelerator is added in an amount of less than 1 wt % based on the total weight of the TPV. In some embodiments, stannous chloride may be used in an amount of from about 0.5 to about 2.0 phr, or from about 1.0 to about 1.5 phr, or from about 1.2 to about 1.3 phr.

Metal Oxide

In some embodiments, metal oxides may be added to the vulcanization process. The metal oxide can act as a scorch retarder in the vulcanization process. Useful metal oxides include zinc oxides having a mean particle diameter of about 0.05 to about 0.15 μm. Useful zinc oxide can be obtained commercially under the tradename Kadox™ 911 (Horsehead Corp.).

In some embodiments, from about 0.1 to about 6.0 phr, or from about 1.0 to about 5.0 phr, or from about 2.0 to about 4.0 phr of zinc oxide may be employed.

Additives

The TPV may further comprise one or more additives. These additives may be present in addition to, or in place of the additives which may be present in the rubber and thermoplastic resin compositions used to make the TPV. Suitable additives include, but are not limited to, plasticizers, fillers, and processing aids.

The TPV composition may also include reinforcing and non-reinforcing fillers, antioxidants, stabilizers, antiblocking agents, anti-static agents, waxes, foaming agents, pigments, flame retardants and other processing aids known in the rubber compounding art. Fillers and extenders that can be utilized include conventional inorganics such as calcium carbonate, clays, silica, talc, titanium dioxide, carbon black, as well as organic and inorganic nanoscopic fillers. Fillers, such as carbon black, may be added as part of a masterbatch, and for example may be added in combination with a carrier such as polypropylene.

In one or more embodiments, the TPV includes at least about 5 wt %, 6 wt %, 7 wt %, 8 wt %, 9 wt %, or 10 wt % or of one or more fillers, such as calcium carbonate, clays, silica, talc, titanium dioxide, carbon black, and blends thereof, based on the weight of the TPV. In preferred embodiments, the TPV includes clay and/or carbon black in an amount ranging from a low of about 5 wt %, 6 wt %, 7 wt %, 8 wt %, 9 wt %, or 10 wt % to a high of about 15 wt %, 16 wt %, 17 wt %, 18 wt %, 19 wt %, or 20 wt %, based on the total weight of the TPV.

In one or more embodiments, the TPV comprises antioxidants in an amount less than or equal to 5 wt %, or 4 wt %, or 3 wt %, or 2 wt %, or 1 wt %, or 0.5 wt %, based on the total weight of the TPV, where desirable ranges may include ranges from any lower limit to any upper limit.

Methods for Making Thermoplastic Vulcanizate Compositions

Any process for making TPVs may be employed. In one or more embodiments, the individual materials and components, such as the one or more rubber components, thermoplastic resin components, additive oils, curatives, other additives, etc., may be blended by melt-mixing in any order in a mixer heated to above the melting temperature of the thermoplastic resin component.

The one or more components, thermoplastic resin components, and curing agents can be added to a heated mixer as individual feed streams, as a tumbled blend, or as a masterbatch. The one or more thermoplastic resin components can be added before cure or divided in any proportions between before or after the addition of the curative. The additive oil, e.g. process oil, can be added during mastication before the addition of the curative, after the addition of the curative, or divided in any proportions between before and after the addition of the curative.

Preferably, the one or more curing agents are incorporated into the melt within a target range of melt temperature over a specified period of time (<120 seconds). The one or more curing agents can be added using any suitable technique, such as by injection as a solution in a compatible process oil, as a neat solid, as a neat melt, or as a masterbatch, for example.

One or more fillers or other additives can be introduced to the melt either before, during or after the addition of the curative. The additives, fillers or other compounds, which may interfere with the curing agents, should be added after curing reaches the desired level. Preferably, those additives are added to the melt as a slurry or paste in a compatible rubber process oil. Powder blends or masterbatches of these components can be prepared in a wax or polymer carrier to facilitate metering and mixing. A side feeder can also be used to add the one or more mineral fillers and other additives.

Any process for making TPVs can be employed, so long as the propylene copolymer is added prior to the dynamic vulcanization of the crosslinkable rubber. For example, the individual materials and components, such as the one or more rubber components, polyolefinic thermoplastic resin components, thermoplastic modifiers, including the propylene copolymer, curing agents, additive oils, and other additives, can be mixed at a temperature above the melting temperature of the thermoplastic components to form a melt. Illustrative mixing equipment include: extruders with kneaders or mixing elements with one or more mixing tips or flights, extruders with one or more screws, and extruders of co or counter rotating type. Suitable mixing equipment also includes Brabender™ mixers, Banbury™ mixers, Buss mixers and kneaders, and Farrell Continuous mixers, for example. One or more of those mixing equipment, including extruders, can be used in series.

The required mixing for discrete rubber phase morphology and properties can be developed through choice of screw design and screw speed. It is convenient to follow the progression of vulcanization (crosslinking) by monitoring melt temperature or mixing energy or mixing torque requirements during mixing. The mixing torque or mixing energy curve generally goes through a maximum after which the mixing can be continued to achieve the desirable cure level (state) and improve the fabricability for the blend. Following the cure and sufficient mixing of the melt, the melt blend can be processed to form an elastomeric structure using any one or more of the following techniques: milling, chopping, extrusion, pelletizing, injection molding, or any other desirable technique. Additional details for making a TPV may include those described in U.S. Pat. Nos. 4,594,390; 4,130,535; 4,311,628; 4,594,390; and 6,042,260, as well as patent application publications US 2006/0293457 and WO 2004/009327.

The TPVs of the present invention are made in one compounding step, where the PBE is introduced directly to the extrusion reactor before the addition of the curative. As such, the process for making the TPVs is in direct contrast to those made by a 2-step compounding process where vulcanized TPVs are blended with a PBE in a second step after the first vulcanization process.

The method for making the TPVs described herein may comprise: (a) introducing a rubber to an extrusion reactor; (b) introducing at least one thermoplastic resin to the extrusion reactor, such as introducing at least 10 wt % of the at least one thermoplastic resin to the extrusion reactor; (c) introducing PBE to the extrusion reactor, such as introducing from 1 wt % to 9 wt % of the PBE; (d) introducing at least 5 wt % of one or more fillers, based on the total weight of the thermoplastic vulcanizate, to the extrusion reactor; (e) introducing a first amount of process oil to the extrusion reactor at a first oil injection location; (f) introducing curative to the extrusion reactor a location that is downstream of the first oil injection location and that is downstream of the location where the PBE is introduced to the extrusion reactor; (g) introducing a second amount of process oil to the extrusion reactor at a second oil injection location, where the second oil injection location is downstream of the location where the curative is introduced to the extrusion reactor; and (h) dynamically vulcanizing the rubber with the curative in the presence of the thermoplastic resin and the PBE to form the thermoplastic vulcanizate.

The present method can provide a TPV at an extrusion rate of at least about 60 kg/hour, or at least about 65 kg/hour, or at least 70 kg/hour, or at least about 75 kg/hour, or at least about 80 kg/hour, or at least about 85 kg/hour, or at least 90 kg/hour, or at least about 95 kg/hour. Increased extrusion rates are advantageous for commercial production as more product can be made for a given amount of time.

In preferred embodiments, the extrusion reactor is a multi-screw extruder, such as a twin-screw extruder. Those skilled in the art will recognize that the extruder can be configured using different barrel lengths, and different arrangements of solid barrels and combination barrels, depending on processing requirements. Also, ports may be included wherever they are deemed useful. Those skilled in the art will also recognize that the gearing can be changed to alter the rotation of one or more of the screws with appropriate screw designs. For example, a screw design with several mixing sections including a combination of forward convey, neutral, left handed kneading blocks and left handed convey elements may be used. The mixing sections of the screw may be chosen to ensure adequate mixing of the process oil and cure agents, while providing sufficient residence time and shear for completing the cure reaction, without slip or surging in the extruder.

In some embodiments, the extrusion reactor is chosen such that there are at least 5, or at least 7, or at least 10, or at least 15 barrel sections. In some embodiments of the method, the rubber, thermoplastic resin, and PBE are introduced to the extrusion reactor in the feed throat, or the first barrel section of the reactor, or in one of the first five barrel sections of the extrusion reactor. The curative is introduced to the extrusion reactor in a section that is downstream of where the PBE is introduced to the extrusion reactor.

The free process oil may be introduced to the extrusion reactor in at least two different locations. A first amount of the process oil may be introduced to the extrusion reactor at a first oil injection location that is upstream of the location where the curative is introduced to the extrusion reactor. A second amount of the process oil may be introduced to the extrusion reactor at a second oil injection location that is downstream of the location where the curative is introduce to the extrusion reactor. In some embodiments, from about 55 wt %, or 56 wt %, or 57 wt %, or 58 wt %, or 59 wt %, or 60 wt % to about 65 wt %, or 66 wt %, or 67 wt %, or 68 wt %, or 69 wt %, or 70 wt %, of process oil, based on the total amount of oil in the TPV, may be introduced to the extrusion reactor at the first oil injection location. IN some embodiments, from about 25 wt %, 26 wt %, 27 wt %, 28 wt %, 29 wt %, 30 wt %, or 31 wt %, to about 40 wt %, or 41 wt %, or 42 wt %, or 43 wt %, or 44 wt %, or 45 wt %, or 46 wt %, of process oil, based on the total amount of oil in the TPV, may be introduced to the extrusion reactor at the second oil injection location.

Product Characteristics

In one or more embodiments, the TPV is cured to an extent such that the rubber is completely or fully cured. In some embodiments, the TPV is cured such that less than 5 wt %, or less than 4 wt %, or less than 3 wt % of the rubber is extractable by cyclohexane at 23° C. Alternatively, in one or more embodiments, the rubber has a degree of cure such that the crosslink density is preferably at least $4 \times 10^{-5}$, or at least $7 \times 10^{-5}$, or at least $10 \times 10^{-5}$ moles per milliliter of rubber. See also "Crosslink Densities and Phase Morphologies in Dynamically Vulcanized TPEs," by Ellul et al, RUBBER CHEMISTRY AND TECHNOLOGY, Vol. 68, pp. 573-584 (1995).

Despite the fact that the rubber may be fully cured, the TPV can be processed and reprocessed by conventional plastic processing techniques such as extrusion, injection molding, blow molding, and compression molding. The rubber within these TPVs can be in the form of finely-divided and well-dispersed particles of vulcanized or cured rubber within a continuous thermoplastic phase or matrix. The rubber particles can have an average diameter that is less than 50 μm, or less than 30 μm, or less than 10 μm, or less than 5 μm, and or less than 1 μm. In some embodiments, the rubber particles have an average diameter greater than 2 millimicrons, or greater than 5 millimicrons, or greater than 10 millimicrons. In certain embodiments, at least 50%, optionally at least 60%, and optionally at least 75% of the rubber particles have an average diameter of less than 5 μm, or less than 2 μm, or less than 1 μm.

As described herein, the TPV comprises (i) rubber, (ii) thermoplastic resin, (iii) PBE, (iv) oil, and (v) filler(s). Preferably, the TPV comprises at least 10 wt % of thermoplastic resin, from 1 to 9 wt % of PBE, and at least 5 wt % of one or more fillers. The ingredients of the TPV are mixed in the extrusion reactor such that the resulting TPV comprises a rubber phase that is dispersed and at least partially cross-linked within a continuous thermoplastic component that comprises thermoplastic resin and PBE. In some embodiments, the thermoplastic resin comprises a fractional polypropylene and a second polypropylene having a melt flow rate higher than the melt flow rate of the fractional polypropylene. In some embodiments, the thermoplastic resin comprises a fractional polypropylene having a melt flow rate of less than 2 g/10 min, a second polypropylene having a melt flow rate of from about 25 to about 45 g/10 min, and a third polypropylene having a melt flow rate of from about 5 to about 30 g/10 min, where the second and third polypropylenes are different.

In some embodiments, the TPV may have a Shore A hardness of greater than 60, or greater than 65, or greater than 70, or greater than 75, and less than 90, or less than 85, or less than 80, or less than 75. Such TPVs may beneficially exhibit an ultimate elongation of greater than 400%, or greater than 410%, or greater than 415%, or greater than 420%, or greater than 425%, or greater than 430%.

Neat TPVs comprising PBE made utilizing the one-step compounding process described herein may exhibit improved surface quality and extrusion processability (e.g., extrusion pressure and specific throughput) as compared to TPVs that do not contain PBEs. Surprisingly, these benefits are achieved without significantly affecting the Shore A hardness or the LCR viscosity of the TPV. Further, in some embodiments, the TPVs have improved surface finish and extruder processability with only minimal impact (if any) on the compression set of the TPV.

Without being bound by theory, it is believed that the addition of the PBE allows for increasing the continuous (plastic) phase of the TPV, so that in the TPV melt state the effect of the discontinuous crosslinked rubber particles is diluted and the tendency to melt stagnate is reduced. Further, when the TPV is in the solid state, the PBE beneficially has decreased crystallinity as compared to the thermoplastic resin such that the hardness and other physical properties of the TPV are not significantly impaired.

The TPVs described herein may be particularly useful for producing end-use articles having good aesthetics. Further, the TPVs may be advantageously extruded at lower temperatures and lower pressures than TPVs that do not comprise PBEs. In general, the throughput of an extruder is typically limited by the motor load (e.g., the gear box set point and maximum possible torque of the motor) or the maximum pressure at which the extruder is capable of operating. Advantageously, the TPVs described herein can be extruded at lower temperatures, for example where the extruder operates with a die temperature of less than 200° C., or less than 195° C., or less than 190° C., or less than 185° C., or at about 180° C., or less than 180° C. When the TPVs are extruded at the reduced temperature, the extrusion pressure exhibited by the extruder may be reduced as compared to the extrusion pressure exhibited by the extruder when extruding a TPV that does not comprise PBEs.

End Use Applications

The TPV compositions described herein may be useful for making articles by extrusion, injection molding, blow molding, calendaring and compression molding techniques. Particularly, the TPV compositions herein may be useful for making a variety of articles such as molded corners, molded end caps, glass run channels, trunk seals, tailgate seals, cowl seals, gap fillers, glass encapsulation, cut line seals, door seals, hood-to-radiator seals, windshield seals, sunroof seals, roof line seals, rear window seals, rocker panels, sashes, and belt-line seals. In one or more embodiments, the TPVs described can be at least partially adhered to a glass substrate, such as for glass encapsulation. Illustrative uses for glass encapsulation include windshield seals, sunroof seals, rear window seals, side window seals, and quarterlight seals, for example. Preferably, the thermoplastic elastomer composition is extruded using techniques known in the art to form an extruded elastomeric profile or gasket. This extruded profile or gasket is then adhered to the glass substrate.

EXAMPLES

In order to provide a better understanding of the foregoing discussion, the following non-limiting examples are offered. Although the examples may be directed to specific embodiments, they are not to be viewed as limiting the invention in any specific respect.

Materials Used in Examples

"V3666" was Vistalon™ 3666 EPDM rubber which is an ethylene-propylene-diene rubber that has 64.0 wt % ethylene content (ASTM D3900) and 4.5 wt % ENB diene content (ASTM D6047). V3666 is oil extended with 75 phr of oil and has an oil-extended Mooney Viscosity of 52 MU (ML 1+4, 125° C.; ASTM D1646). V3666 is commercially available from ExxonMobil Chemical Company, Houston, Tex.

"VM3000" was Vistamaxx™ 3000 propylene-based elastomer which is a random propylene-ethylene copolymer with an ethylene content of 11 wt %. VM3000 has a density of 0.873 g/cc (ASTM D1505), a melt index of 3.6 g/10 min (ASTM D1238; 190° C. and 2.16 kg weight), a MFR of 8 g/10 min (ASTM D1238; 230° C. and 2.16 kg weight), a Shore D hardness of 33 (ASTM D2240), and a Vicat softening temperature of 65.6° C. VM3000 is commercially available from ExxonMobil Chemical Company, Houston, Tex.

"VM3020" was Vistamaxx™ 3020 propylene-based elastomer which is a random propylene-ethylene copolymer with an ethylene content of 11 wt %. VM3020 has a density of 0.874 g/cc (ASTM D1505), a melt index of 1.1 g/10 min (ASTM D1238; 190° C. and 2.16 kg weight), a MFR of 3 g/10 min (ASTM D1238; 230° C. and 2.16 kg weight), a Shore D hardness of 34 (ASTM D2240), and a Vicat softening temperature of 68.3° C. VM3020 is commercially available from ExxonMobil Chemical Company, Houston, Tex.

"PP5341" was ExxonMobil™ PP5341 polypropylene which is a polypropylene homopolymer with a density of 0.9 g/cc and a MFR of 0.83 g/10 min (ASTM D1238; 230° C. and 2.16 kg weight). PP5341 is commercially available from ExxonMobil Chemical Company, Houston, Tex.

"PP7032" was ExxonMobil™ PP7032E2 polypropylene impact copolymer which is a propylene-ethylene impact copolymer. PP7032 has a density of 0.9 g/cc and a MFR of 4.0 g/10 min (ASTM D1238; 230° C. and 2.16 kg weight). PP7032 is commercially available from ExxonMobil Chemical Company, Houston, Tex.

"PPF180A" is a polypropylene homopolymer commercially available from Braskem. PPF180A has a MFR of 17 g/10 min (ASTM D-1238; 230° C. and 2.16 kg weight).

"PP556E" was Basell Moplen HP556E which is a polypropylene homopolymer. PP556E has a melt flow rate (230° C., 2.16 kg) of 0.8 g/10 min (ISO 1133), and a Vicat softening temperature of 153° C. (ISO 306, A50 (50° C./h 10 N)) and 93° C. (ISO 306, B50 (50° C./h, 50 N)).

"Silicone MB" was a silicone masterbatch MB50-321 commercially available from Dow Corning. The Silicone MB is a pelletized formulation containing 50 wt % of an ultrahigh molecular weight siloxane polymer dispersed in 50 wt % polypropylene homopolymer.

"Clay" was Icecap™ K Clay.

"Zinc Oxide" or "ZnO" was Kadox 911.

"$SnCl_2$ MB" was an anhydrous stannous chloride polypropylene masterbatch. The $SnCl_2$ MB contained 45 wt % stannous chloride and 55 wt % of polypropylene having an MFR of 0.8 g/10 min (ASTM D1238; 230° C. and 2.16 kg weight).

"Black MB" was a carbon black masterbatch that contained 57.75 wt % polypropylene having an MFR of 35 g/10 min (ASTM D1238; 230° C. and 2.16 kg weight), 41.1 wt % carbon black, 1 wt % Kenamide S, and 0.25 wt % primary antioxidant.

"RIO" was a phenolic resin-in-oil curative that contained 30 wt % phenolic resin and 70 wt % oil.

"Oil #1" and "Oil #2" were Paralux 6001R Oil which is commercially available from Chevron Corporation, Houston, Tex.

"Oil #3" and Oil #4" were Sunpar 150 oil.

Test Methods

Shore A Hardness was measured using a Zwick automated durometer according to ASTM D2250 (15 sec. delay).

Extrusion surface roughness ("ESR") in microinches (micrometers) was measured as follows: approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner ESR was measured on the samples using a model EMD-04000-W5 Surfanalyzer System 4000 including a universal probe 200 mg stylus force and a Surfanalyzer proper tip type EPT-01049 (0.025 mm (0.0001") stylus radius).

Ultimate tensile strength ("UTS"), modulus at 100% extension ("M100"), and ultimate elongation ("UE") were measured on injection molded plaques according to ASTM D-412 at 23° C. (unless otherwise specified) at 50 mm per minute by using an Instron testing machine.

The LCR capillary viscosity was measured according to ASTM D3835 at a shear rate of 1200 $sec^{-1}$ and 240° C. using a die with a 1 mm diameter, 30 mm length, 180° entry angle die. The LCR viscosity is reported in Pa·s.

The Compression Set (C-Set) at 22 hours and 70° C. and the Compression Set (C-Set) at 70 hours and 125° C. were measured using ISO 815.

Rheological properties of the TPVs were measured by small angle and large angle oscillatory shear measurements (SAOS and LAOS, respectively). The SAOS and LAOS measurements were completed on an Alpha Technologies ATD 1000 using serrated 25 mm parallel plates with a gap of 2.5 mm. The TPV samples were prepared for the test by placing the sample in a vacuum oven at a temperature between 60 and 70° C. for between 8 and 12 hours prior to analysis. 5 gram quantities of the material were then placed between two 0.001" polyester sheets (Alpha part #F0141) to prevent the samples from sticking to the parallel plate fixture. The material was allowed to melt for 30 seconds prior to closing the fixture. The first shear measurement was made after 4.5 minutes of clamping inside the fixture. Bulk Modulus components and shear viscosity components from each run were calculated by the machine software (Workbench v 5.70 published by Alpha Technologies). The S' was measured at 100% strain, 5 rad/s, and 215° C. The G' was measured at 2% strain, 0.6 rad/s, 90° C. Tan Delta was measured at three different conditions, Tan Δ 2 at 2% strain, 0.6 rad/s, 90° C.; Tan Δ 6 at 6% strain, 0.6 rad/s, 90° C.; and Tan Δ 100 at 100% strain, 5 rad/s, 215° C. Tests were run in duplicate and the average reported.

Example 1

TPVs were prepared by dynamically mixing and vulcanizing in a twin-screw extruder the formulations described in Tables 1A and 1B. The formulations in Tables 1A and 1B describe the amount of each ingredient in the formulation as parts per hundred parts of rubber ("phr"). Certain physical properties of the TPV are also listed in Tables 1A and 1B.

Tables 2A and 2B list the formulations from Tables 1A and 1B by the weight percent of each material type, e.g., rubber, thermoplastic resin, etc., in the thermoplastic vulcanizate, where the weight percent of the material type was calculated using the ingredients in Tables 1A and 1B.

Tables 3A and 3B show the relative contribution of the main components to the continuous phase. Thus, Tables 3A and 3B show the relative amounts of each polypropylene (that was not part of a masterbatch) and the PBEs in the continuous phase of the TPV.

The thermoplastic resin, PBE, granulated rubber, clay, zinc oxide, $SnCl_2$ masterbatch, and carbon black masterbatch were added to the extruder at the feed throat. The phenolic resin-in-oil was injected into the extruder after the feed throat and initial mixing zone. A first portion ("Oil #1") of the free process oil was introduced to the extruder after the feed throat but before the phenolic resin-in-oil injection point and a second portion ("Oil #2") of the free process oil was introduced to the extruder after the phenolic resin-in-oil injection point. The Barrel # in Table 1 indicates the location where the ingredient was added to the extruder: i.e., "1" refers to first barrel section of the extruder where the feed throat was located, where, "2", "5", and "10" refer to the downstream barrel sections 2, 5, and 10, respectively.

The extrusion took place at the rate and speed specified in Tables 1A and 1B. The barrel metal temperature profile for the extrusion, starting from barrel section 2 down towards the die to barrel section 15, utilized the following temperature set points: 130/140/150/160/170/160/170/180/180/190/200/200/200/200. Low molecular weight contaminants, reaction by-products, residual moisture and the like were removed by venting through one or more vent ports in the extruder, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing cure reaction, without slip or surging in the extruder, were used.

TABLE 1A

Example 1 Physical Properties and Formulations by Ingredients in phr

| Ingredient | Barrel # | TPV-A210 | TPV-A213 | TPV-A214 | TPV-A215 | TPV-A216 | TPV-A220 | TPV-A219 | TPV-A218 | TPV-A217 |
|---|---|---|---|---|---|---|---|---|---|---|
| V3666 | 1 | 175 | 175 | 175 | 175 | 175 | 175 | 175 | 175 | 175 |
| PP5341 | 1 | 38.34 | 38.34 | 38.34 | 38.34 | 38.34 | 38.34 | 38.34 | 38.34 | 38.34 |

TABLE 1A-continued

Example 1 Physical Properties and Formulations by Ingredients in phr

|  | Barrel # | TPV-A210 | TPV-A213 | TPV-A214 | TPV-A215 | TPV-A216 | TPV-A220 | TPV-A219 | TPV-A218 | TPV-A217 |
|---|---|---|---|---|---|---|---|---|---|---|
| VM3000 | 1 | 0 | 7.10 | 14.49 | 22.19 | 30.23 | 0 | 0 | 0 | 0 |
| VM3020 | 1 | 0 | 0 | 0 | 0 | 0 | 7.10 | 14.49 | 22.19 | 30.23 |
| Clay | 1 | 42 | 42 | 42 | 42 | 42 | 42 | 42 | 42 | 42 |
| Black MB | 1 | 24.25 | 24.25 | 24.25 | 24.25 | 24.25 | 24.25 | 24.25 | 24.25 | 24.25 |
| ZnO | 1 | 2 | 2 | 2 | 2 | 2 | 2 | 2 | 2 | 2 |
| SnCl$_2$ MB | 1 | 1.67 | 1.67 | 1.67 | 1.67 | 1.67 | 1.67 | 1.67 | 1.67 | 1.67 |
| RIO | 5 | 10.29 | 10.67 | 10.29 | 10.29 | 10.29 | 10.29 | 10.29 | 10.29 | 10.29 |
| Oil #1 | 2 | 10.82 | 10.82 | 10.82 | 10.82 | 10.82 | 10.82 | 10.82 | 10.82 | 10.82 |
| Oil #2 | 10 | 43.30 | 43.30 | 43.30 | 43.30 | 43.30 | 43.30 | 43.30 | 43.30 | 43.30 |
| Total phr | — | 347.67 | 354.77 | 362.16 | 369.86 | 377.90 | 354.77 | 362.16 | 369.86 | 377.90 |
| Extrusion Rate (kg/hr) | — | 97 | 97 | 97 | 97 | 97 | 97 | 97 | 97 | 97 |
| Extruder RPM | — | 350 | 350 | 350 | 350 | 350 | 350 | 350 | 350 | 350 |
| Physical Properties |  |  |  |  |  |  |  |  |  |  |
| Hardness (Shore A) | — | 72.4 | 71.6 | 73.0 | 73.4 | 73.9 | 72.4 | 73.8 | 74.0 | 73.9 |
| ESR (Ra) | — | 44 | 24 | 33 | 31 | 22 | 30 | 21 | 36 | 26 |
| UTS (MPa) | — | 7.23 | 7.15 | 7.49 | 7.55 | 7.86 | 7.28 | 7.65 | 7.83 | 8.52 |
| M100 (MPa) | — | 3.27 | 3.19 | 3.28 | 3.37 | 3.53 | 3.33 | 3.46 | 3.52 | 3.50 |
| UE (%) | — | 420 | 423 | 464 | 473 | 505 | 420 | 433 | 454 | 506 |
| LCR @ 1200/s (Pa · s) | — | 78.2 | 78.9 | 78.5 | 77.6 | 75.5 | 76.2 | 75.6 | 76.3 | 77.4 |
| S' | — | 2.27 | 1.93 | 1.56 | 1.11 | 0.77 | 1.70 | 1.36 | 1.04 | 0.85 |
| G' | — | 1776 | 1501 | 1416 | 1249 | 1179 | 1532 | 1418 | 1301 | 1168 |
| TanΔ 100% | — | 0.75 | 0.80 | 0.88 | 1.08 | 1.31 | 0.95 | 1.08 | 1.26 | 1.46 |
| TanΔ 2% | — | 0.08 | 0.09 | 0.09 | 0.10 | 0.11 | 0.08 | 0.09 | 0.10 | 0.10 |
| TanΔ 6% | — | 0.10 | 0.10 | 0.10 | 0.11 | 0.11 | 0.09 | 0.10 | 0.10 | 0.11 |
| C-Set, 22 hrs @ 77° C. | — | 25.4 | 28.9 | 30.4 | 34.6 | 36.8 | 26.7 | 28.2 | 33.4 | 33.8 |
| C-Set, 70 hrs @ 125° C. | — | 40.8 | 39.1 | 45.9 | 49.0 | 54.0 | 42.7 | 45.8 | 51.0 | 53.2 |

TABLE 1B

Example 1 Physical Properties and Formulations by Ingredients in phr

|  | Barrel # | TPV-A209 | TPV-A228 | TPV-A227 | TPV-A226 | TPV-A225 | TPV-A221 | TPV-A222 | TPV-A223 | TPV-A224 |
|---|---|---|---|---|---|---|---|---|---|---|
| Ingredient |  |  |  |  |  |  |  |  |  |  |
| V3666 | 1 | 175 | 175 | 175 | 175 | 175 | 175 | 175 | 175 | 175 |
| PP5341 | 1 | 49.99 | 49.99 | 49.99 | 49.99 | 49.99 | 49.99 | 49.99 | 49.99 | 49.99 |
| VM3000 | 1 | 0 | 7.35 | 15.01 | 22.99 | 31.31 | 0 | 0 | 0 | 0 |
| VM3020 | 1 | 0 | 0 | 0 | 0 | 0 | 7.35 | 15.01 | 22.99 | 31.31 |
| Clay | 1 | 42 | 42 | 42 | 42 | 42 | 42 | 42 | 42 | 42 |
| Black MB | 1 | 25.36 | 25.36 | 25.36 | 25.36 | 25.36 | 25.36 | 25.36 | 25.36 | 25.36 |
| ZnO | 1 | 2 | 2 | 2 | 2 | 2 | 2 | 2 | 2 | 2 |
| SnCl$_2$ MB | 1 | 1.67 | 1.67 | 1.67 | 1.67 | 1.67 | 1.67 | 1.67 | 1.67 | 1.67 |
| RIO | 5D | 12.60 | 12.60 | 12.60 | 12.60 | 12.60 | 12.60 | 12.60 | 12.60 | 12.60 |
| Oil #1 | 2D | 7.72 | 7.72 | 7.72 | 7.72 | 7.72 | 7.72 | 7.72 | 7.72 | 7.72 |
| Oil #2 | 10D | 43.78 | 43.78 | 43.78 | 43.78 | 43.78 | 43.78 | 43.78 | 43.78 | 43.78 |
| Total phr | — | 360.12 | 367.47 | 375.13 | 383.11 | 391.43 | 367.47 | 375.13 | 383.11 | 391.43 |
| Extrusion Rate (kg/hr) | — | 97 | 97 | 97 | 97 | 97 | 97 | 97 | 97 | 97 |
| Extruder RPM | — | 350 | 350 | 350 | 350 | 350 | 350 | 350 | 350 | 350 |
| Physical Properties |  |  |  |  |  |  |  |  |  |  |
| Hardness (Shore A) | — | 77.5 | 79.0 | 79.4 | 79.0 | 79.0 | 78.1 | 78.6 | 78.9 | 79.4 |
| ESR (Ra) | — | 37 | 29 | 32 | 24 | 24 | — | 26 | 26 | 30 |
| UTS (MPa) | — | 7.61 | 8.58 | 8.23 | 8.29 | 8.61 | 8.67 | 8.38 | 9.11 | 9.16 |
| M100 (MPa) | — | 3.86 | 4.11 | 4.14 | 4.15 | 4.10 | 4.05 | 4.12 | 4.16 | 4.17 |
| UE (%) | — | 392 | 429 | 426 | 443 | 477 | 444 | 427 | 472 | 489 |
| LCR @ 1200/s (Pa · s) | — | 77.1 | 74.6 | 73.4 | 73.3 | 73.5 | 75.1 | 75.0 | 72.5 | 74.3 |
| S' | — | 1.96 | 1.39 | 1.10 | 0.83 | 0.63 | 1.42 | 1.11 | 0.97 | 0.74 |
| G' | — | 2444 | 2285 | 2050 | 184 | 1651 | 2235 | 2003 | 1818 | 1654 |
| TanΔ 100% | — | 0.82 | 0.98 | 1.11 | 1.30 | 1.49 | 1.04 | 1.25 | 1.34 | 1.56 |
| TanΔ 2% | — | 0.08 | 0.09 | 0.09 | 0.09 | 0.10 | 0.08 | 0.08 | 0.09 | 0.10 |
| TanΔ 6% | — | 0.10 | 0.10 | 0.10 | 0.10 | 0.11 | 0.09 | 0.09 | 0.10 | 0.10 |
| C-Set, 22 hrs @ 77° C. | — | 28.1 | 30.0 | 34.8 | 35.4 | 34.7 | 28.1 | 31.3 | 32.8 | 36.8 |
| C-Set, 70 hrs @ 125° C. | — | 44.6 | 46.7 | 53.3 | 53.2 | 57.1 | 47.6 | 50.6 | 53.3 | 59.1 |

TABLE 2A

Example 1 Formulations by Material Type in Weight Percent

| Ingredient | TPV-A210 | TPV-A213 | TPV-A214 | TPV-A215 | TPV-A216 | TPV-A220 | TPV-A219 | TPV-A218 | TPV-A217 |
|---|---|---|---|---|---|---|---|---|---|
| Rubber | 28.76 | 28.19 | 27.61 | 27.04 | 26.46 | 28.19 | 27.61 | 27.04 | 26.46 |
| Thermoplastic Resin | 15.32 | 15.01 | 14.71 | 14.40 | 14.09 | 15.01 | 14.71 | 14.40 | 14.09 |
| PBE | 0.00 | 2.00 | 4.00 | 6.00 | 8.00 | 2.00 | 4.00 | 6.00 | 8.00 |
| Oil | 39.21 | 38.43 | 37.64 | 36.86 | 36.07 | 38.43 | 37.64 | 36.86 | 36.07 |
| Clay | 12.08 | 11.84 | 11.60 | 11.36 | 11.11 | 11.84 | 11.60 | 11.36 | 11.11 |
| Carbon Black | 2.87 | 2.81 | 2.75 | 2.69 | 2.64 | 2.81 | 2.75 | 2.69 | 2.64 |
| Phenolic Resin | 0.89 | 0.87 | 0.85 | 0.83 | 0.82 | 0.87 | 0.85 | 0.83 | 0.82 |
| Zinc Oxide | 0.58 | 0.56 | 0.55 | 0.54 | 0.53 | 0.56 | 0.55 | 0.54 | 0.53 |
| $SnCl_2$ | 0.22 | 0.21 | 0.21 | 0.20 | 0.20 | 0.21 | 0.21 | 0.20 | 0.20 |
| Kenamide | 0.07 | 0.07 | 0.07 | 0.07 | 0.06 | 0.07 | 0.07 | 0.07 | 0.06 |
| Primary AO | 0.02 | 0.02 | 0.02 | 0.02 | 0.02 | 0.02 | 0.02 | 0.02 | 0.02 |

TABLE 2B

Example 1 Formulations by Material Type in Weight Percent

| Ingredient | TPV-A209 | TPV-A228 | TPV-A227 | TPV-A226 | TPV-A225 | TPV-A221 | TPV-A222 | TPV-A223 | TPV-A224 |
|---|---|---|---|---|---|---|---|---|---|
| Rubber | 27.77 | 27.21 | 26.66 | 26.10 | 25.55 | 27.21 | 26.66 | 26.10 | 25.55 |
| Thermoplastic Resin | 18.20 | 17.84 | 17.47 | 17.11 | 16.75 | 17.84 | 17.47 | 17.11 | 16.75 |
| PBE | 0.00 | 2.00 | 4.00 | 6.00 | 8.00 | 2.00 | 4.00 | 6.00 | 8.00 |
| Oil | 37.58 | 36.82 | 36.07 | 35.32 | 34.57 | 36.82 | 36.07 | 35.32 | 34.57 |
| Clay | 11.66 | 11.43 | 11.20 | 10.96 | 10.73 | 11.43 | 11.20 | 10.96 | 10.73 |
| Carbon Black | 2.89 | 2.84 | 2.78 | 2.72 | 2.66 | 2.84 | 2.78 | 2.72 | 2.66 |
| Phenolic Resin | 1.05 | 1.03 | 1.01 | 0.99 | 0.97 | 1.03 | 1.01 | 0.99 | 0.97 |
| Zinc Oxide | 0.56 | 0.54 | 0.53 | 0.52 | 0.51 | 0.54 | 0.53 | 0.52 | 0.51 |
| $SnCl_2$ | 0.21 | 0.20 | 0.20 | 0.20 | 0.19 | 0.20 | 0.20 | 0.20 | 0.19 |
| Kenamide | 0.07 | 0.07 | 0.07 | 0.07 | 0.06 | 0.07 | 0.07 | 0.07 | 0.06 |
| Primary AO | 0.02 | 0.02 | 0.02 | 0.02 | 0.02 | 0.02 | 0.02 | 0.02 | 0.02 |

TABLE 3A

Relative Plastic Content of Continuous Phase of Example 1 TPVs

| Ingredient | TPV-A210 | TPV-A213 | TPV-A214 | TPV-A215 | TPV-A216 | TPV-A220 | TPV-A219 | TPV-A218 | TPV-A217 |
|---|---|---|---|---|---|---|---|---|---|
| PP5341 | 100.0% | 84.4% | 72.6% | 63.3% | 55.9% | 84.4% | 72.6% | 63.3% | 55.9% |
| VM3000 | 0.0% | 15.6% | 27.4% | 36.7% | 44.1% | 0.0% | 0.0% | 0.0% | 0.0% |
| VM3020 | 0.0% | 0.0% | 0.0% | 0.0% | 0.0% | 15.6% | 27.4% | 36.7% | 44.1% |

TABLE 3B

Relative Plastic Content of Continuous Phase of Example 1 TPVs

| Ingredient | TPV-A209 | TPV-A228 | TPV-A227 | TPV-A226 | TPV-A225 | TPV-A221 | TPV-A222 | TPV-A223 | TPV-A224 |
|---|---|---|---|---|---|---|---|---|---|
| PP5341 | 100.0% | 87.2% | 76.9% | 68.5% | 61.5% | 87.2% | 76.9% | 68.5% | 61.5% |
| VM3000 | 0.0% | 12.8% | 23.1% | 31.5% | 38.5% | 0.0% | 0.0% | 0.0% | 0.0% |
| VM3020 | 0.0% | 0.0% | 0.0% | 0.0% | 0.0% | 12.8% | 23.1% | 31.5% | 38.5% |

As seen in Tables 1A and 1B, the addition of the PBE resulted in an improvement in the ultimate elongation of the TPV as compared to the control TPVs, TPV-A209 and TPV-A210. The improvement in the ultimate elongation was more pronounced in formulations containing more than 2 wt % of the PBE. Also as seen in Table 1B, the harder TPV formulations that contained the PBE exhibited improved M100 modulus as compared to the comparative TPV-A209.

As seen in Tables 1A and 1B, the Shore A hardness was not significantly affected by the addition of the PBE. Even the formulations containing 8 wt % of the PBE exhibited only a very slight increase in the Shore A hardness as compared to the control TPVs (e.g., TPV-A216 and TPV- A217 compared to TPV-A210 in Table 1A, and TPV-A225 and TPV-A224 compared to TPV-A209 in Table 1B). This result was surprising, as the addition of an equal amount of additional polypropylene would have been expected to increase the hardness of the TPV. That is, in general, increasing the plastic content of the TPV would have been expected to increase the hardness of the TPV. This is illustrated by comparing the Shore A hardness of TPV-A209 and TPV-210, which have similar formulations except that TPV-A209 has an increased plastic content as compared to TPV-A210. However, as seen in Tables 1A and 1B, increasing the plastic content of the TPV by the addition of the PBE unexpectedly did not significantly increase the Shore A hardness of the TPV.

Furthermore, as seen in Tables 1A and 1B, the LCR viscosity of the TPV was not significantly affected by the addition of the PBE. In some examples, the LCR viscosity was reduced as compared to the comparative TPV-A209 and TPV-A210.

The extrusion properties of the TPVs of Example 1 were also tested in a Haake capillary extrusion test. Haake capillary extrusion data was obtained using a Haake PolyLab system using a Rheocord (Model P-300), Rheomex (Model 252P) single-screw extruder equipped with die 557-3100 and capillary die 557-2551 (2 mm capillary diameter and 60 mm length) running software Polylab Monitor v 4.17. The zone set points were 160/170/180/180. The results of the capillary extrusion test are shown in Tables 4A and 4B, where the measurements were taken at different extruder RPMs as indicated in Tables 4A and 4B. The Haake capillary extrusion data was an average of between 30 seconds and 3 minutes of data, with data recoded at more than 1 Hz.

TABLE 4A

Example 1 Capillary Extrusion Results

| TPV | RPM | Rate (g/min) | Die Melt Temp (° C.) | Torque (N*m) | Extruder Exit Pressure (psi) | Die Exit Pressure (psi) | Motor Load (%) |
|---|---|---|---|---|---|---|---|
| TPV-A210 | 10 | 5.1 | 183 | 19.3 | 1718.9 | 1396.4 | 12.1 |
| TPV-A210 | 25 | 12.9 | 183 | 25.6 | 2159.4 | 1749.4 | 16.0 |
| TPV-A210 | 50 | 26.2 | 183 | 31.9 | 2455.6 | 1996.2 | 19.9 |
| TPV-A210 | 100 | 49.5 | 183 | 37.7 | 2648.7 | 2175.2 | 23.6 |
| TPV-A210 | 150 | 68.8 | 183 | 41.9 | 2741.9 | 2268.7 | 26.2 |
| TPV-A210 | 200 | 68.8 | 183 | 38.6 | 2541.7 | 2140.8 | 24.1 |
| TPV-A213 | 10 | 4.8 | 183 | 19.7 | 1728.5 | 1413.5 | 12.3 |
| TPV-A213 | 25 | 11.8 | 183 | 25.3 | 2137.1 | 1746.3 | 15.8 |
| TPV-A213 | 50 | 23.8 | 184 | 29.1 | 2396.3 | 1944.2 | 18.2 |
| TPV-A213 | 50 | 24.0 | 183 | 30.7 | 2458.4 | 2010.4 | 19.2 |
| TPV-A213 | 100 | 50.0 | 183 | 37.6 | 2751.6 | 2259.5 | 23.5 |
| TPV-A213 | 150 | 78.0 | 183 | 43.0 | 2870.3 | 2379.4 | 26.9 |
| TPV-A213 | 200 | 102.6 | 183 | 48.1 | 2925.0 | 2450.4 | 30.0 |
| TPV-A214 | 10 | 4.5 | 182 | 18.1 | 1544.3 | 1290.2 | 11.3 |
| TPV-A214 | 25 | 11.3 | 183 | 24.1 | 1942.5 | 1614.5 | 15.0 |
| TPV-A214 | 50 | 22.8 | 183 | 29.4 | 2279.0 | 1894.9 | 18.4 |
| TPV-A214 | 50 | 22.1 | 183 | 28.8 | 2225.3 | 1829.3 | 18.0 |
| TPV-A214 | 100 | 46.6 | 182 | 36.3 | 2617.1 | 2183.5 | 22.7 |
| TPV-A214 | 150 | 72.0 | 182 | 41.7 | 2758.8 | 2314.1 | 26.1 |
| TPV-A214 | 200 | 91.6 | 182 | 44.5 | 2753.9 | 2342.5 | 27.8 |
| TPV-A215 | 10 | 4.9 | 182 | 18.0 | 1381.3 | 1223.3 | 11.2 |
| TPV-A215 | 25 | 11.4 | 182 | 23.0 | 1829.3 | 1551.8 | 14.4 |
| TPV-A215 | 50 | 22.2 | 183 | 27.9 | 2133.7 | 1809.0 | 17.4 |
| TPV-A215 | 50 | 21.4 | 184 | 27.6 | 2080.7 | 1737.5 | 17.3 |
| TPV-A215 | 100 | 44.6 | 182 | 34.5 | 2459.8 | 2091.5 | 21.6 |
| TPV-A215 | 150 | 67.8 | 183 | 39.9 | 2657.6 | 2260.5 | 24.9 |
| TPV-A215 | 200 | 89.9 | 183 | 42.8 | 2727.0 | 2340.0 | 26.7 |
| TPV-A216 | 10 | 4.9 | 183 | 17.9 | 1342.8 | 1188.4 | 11.2 |
| TPV-A216 | 25 | 11.3 | 183 | 22.0 | 1684.6 | 1484.2 | 13.8 |
| TPV-A216 | 50 | 21.9 | 183 | 25.9 | 1959.8 | 1720.4 | 16.2 |
| TPV-A216 | 50 | 21.2 | 184 | 25.6 | 1892.5 | 1651.7 | 16.0 |
| TPV-A216 | 100 | 44.1 | 183 | 32.6 | 2323.1 | 2021.6 | 20.4 |
| TPV-A216 | 150 | 66.2 | 183 | 37.5 | 2516.5 | 2194.3 | 23.5 |
| TPV-A216 | 200 | 87.3 | 183 | 40.2 | 2606.9 | 2283.9 | 25.1 |

TABLE 4B

Example 1 Capillary Extrusion Results

| TPV | RPM | Rate (g/min) | Die Melt Temp (° C.) | Torque (N*m) | Extruder Exit Pressure (psi) | Die Exit Pressure (psi) | Motor Load (%) |
|---|---|---|---|---|---|---|---|
| TPV-A210 | 10 | 5.1 | 183 | 19.3 | 1718.9 | 1396.4 | 12.1 |
| TPV-A210 | 25 | 12.9 | 183 | 25.6 | 2159.4 | 1749.4 | 16.0 |
| TPV-A210 | 50 | 26.2 | 183 | 31.9 | 2455.6 | 1996.2 | 19.9 |
| TPV-A210 | 100 | 49.5 | 183 | 37.7 | 2648.7 | 2175.2 | 23.6 |

TABLE 4B-continued

Example 1 Capillary Extrusion Results

| TPV | RPM | Rate (g/min) | Die Melt Temp (° C.) | Torque (N*m) | Extruder Exit Pressure (psi) | Die Exit Pressure (psi) | Motor Load (%) |
|---|---|---|---|---|---|---|---|
| TPV-A210 | 150 | 68.8 | 183 | 41.9 | 2741.9 | 2268.7 | 26.2 |
| TPV-A210 | 200 | 68.8 | 183 | 38.6 | 2541.7 | 2140.8 | 24.1 |
| TPV-A220 | 10 | 5.0 | 183 | 18.9 | 1573.9 | 1310.0 | 11.8 |
| TPV-A220 | 25 | 12.0 | 183 | 24.1 | 1969.4 | 1626.3 | 15.1 |
| TPV-A220 | 50 | 23.9 | 183 | 29.1 | 2282.7 | 1886.3 | 18.2 |
| TPV-A220 | 50 | 22.1 | 183 | 26.7 | 2173.5 | 1753.5 | 16.7 |
| TPV-A220 | 100 | 49.6 | 183 | 35.3 | 2568.9 | 2134.0 | 22.1 |
| TPV-A220 | 150 | 75.2 | 183 | 40.9 | 2686.2 | 2254.2 | 25.5 |
| TPV-A220 | 200 | 99.8 | 183 | 46.6 | 2787.0 | 2355.6 | 29.1 |
| TPV-A219 | 10 | 4.9 | 183 | 17.8 | 1448.7 | 1235.5 | 11.1 |
| TPV-A219 | 25 | 11.5 | 183 | 22.3 | 1852.6 | 1550.9 | 14.0 |
| TPV-A219 | 50 | 22.6 | 183 | 26.7 | 2146.2 | 1796.3 | 16.7 |
| TPV-A219 | 100 | 45.1 | 183 | 32.4 | 2447.6 | 2053.9 | 20.2 |
| TPV-A219 | 150 | 66.9 | 183 | 36.4 | 2585.6 | 2184.6 | 22.8 |
| TPV-A219 | 200 | 89.7 | 183 | 41.0 | 2673.5 | 2273.2 | 25.6 |
| TPV-A218 | 10 | 4.7 | 183 | 17.5 | 1396.9 | 1228.3 | 11.0 |
| TPV-A218 | 25 | 10.8 | 183 | 22.0 | 1816.9 | 1540.0 | 13.8 |
| TPV-A218 | 50 | 21.2 | 183 | 26.1 | 2102.9 | 1779.8 | 16.3 |
| TPV-A218 | 50 | 21.1 | 184 | 25.9 | 2052.5 | 1723.1 | 16.2 |
| TPV-A218 | 100 | 43.2 | 183 | 32.2 | 2439.9 | 2062.8 | 20.1 |
| TPV-A218 | 150 | 64.5 | 183 | 36.1 | 2596.0 | 2203.9 | 22.6 |
| TPV-A218 | 200 | 85.9 | 183 | 39.1 | 2628.0 | 2253.7 | 24.4 |

As seen in Tables 4A and 4B, the extrusion pressure was slightly reduced for the TPVs that contained the PBE as compared to the control TPVs, TPV-A209 and TPV-A210. For example, as seen in Table 4A, when extruding TPV-A214, which contained 4 wt % of PBE, decreased die exit pressure and extruder exit pressure at 10-50 rpm were seen as compared to the control TPV-A210. Likewise, when extruding TPV-A215 and TPV-A216, containing 6 wt % and 8 wt % of the PBE, respectively, decreased die exit pressure and extruder exit pressure at 10-150 rpm was seen as compared to the control TPV-A210. Similar benefits are also seen in Table 4B, by comparing TPV-A220, TPV-A219, and TPV-A218 to TPV A-210 at 10-150 rpm.

Extrusion properties of the TPVs were also tested using a Haake Static Experiment. The Haake Static Experiment gives an indication of a TPV's tendency for melt stagnation on a small scale extruder. Without being bound by theory, it is believed that melt stagnation is the result in part of yield stress formation (i.e., solidification) of the melt. Melt stagnation can result in the appearance of aesthetic defects in finished parts, such as edge tear, gels, and surface spots. Attempts have been made to reduce melt stagnation by reducing the fill content of the TPV and/or changing the cure state of the TPV (e.g., making the EPDM particles in the discontinuous phase more deformable so that they flow easier). However, these attempts often negatively impact the performance properties of the TPV, such as hardness, viscosity, and/or compression set.

In the Haake Static Experiment, the thermoplastic vulcanizate material was extruded on a Haake extruder equipped with a capillary die (2 mm×60 mm) and a high frequency pressure transducer capable of measurements greater than 10 Hz. The extruder zone temperatures were set to 160° C. (Zone 1), 170° C. (Zone 2), 180° C. (Zone 3), 180° C. (Die), and an extruder rate of 50 RPM. The resin to be tested was prepared by drying the resin in a convection oven at 60° C. for 8 to 12 hours. The prepared resin was then flood fed the extruder and allowed to purge until an equilibrium pressure was reached. At this time, the extruder's standard processing conditions (e.g., pressure, temperature, torque, motor load, and mass flow rate) were measured. After approximately five minutes at equilibrium, the extruder RPM was set to set to zero for a hold time (t), which varied from 5 seconds to 720 seconds. After time t, the extruder RPM was reset to 50 RPM. The resulting pressure overspike was then measured on the high frequency pressure transducer which collected data at 20 Hz for one minute (t+60 seconds). Measurements were performed in at least duplicate at each time t, and for each individual run, the pressure build was calculated and then averaged for a given time t.

As indicated in FIG. 1, the change in pressure from the overspike as compared to the pressure at equilibrium was calculated, i.e., the area under the curve was measured at equilibrium and after the pressure spike. The results were listed as Delta (psi*sec) and is plotted against the hold time (seconds) in FIGS. 2 and 3. In particular, the pressure build was calculated by:

$$\text{Pressure Build Delta} = \Sigma\{[P(\text{time}) - P\text{avg}]*dt\}$$

where P(avg) was the average pressure between t+45 and t+60 seconds, P(time) was the pressure at the time in question which ranged from the time t+0 to t+60 seconds, where dt was 0.05 seconds (i.e., 1/frequency), and where the pressure build was summed from t=0 to t=60 seconds for each individual run.

Figure 2:
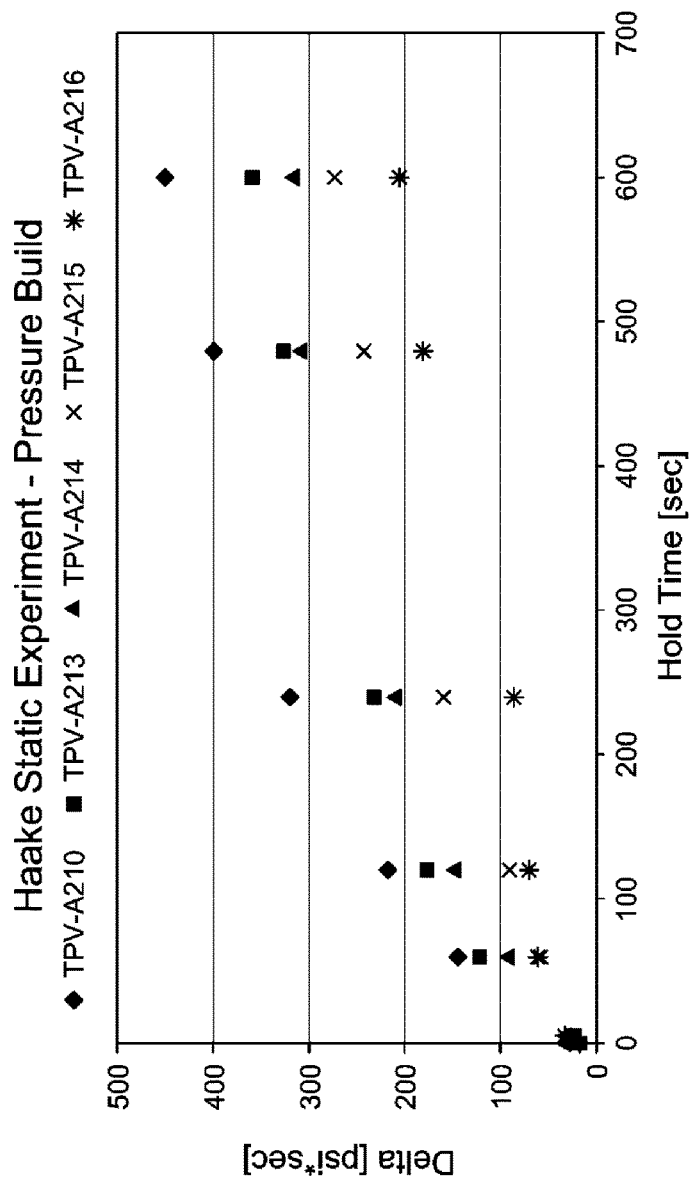
FIGS. 2 and 3 show the change in the pressure build in the Haake Static Experiment for TPVs of Example 1.
Figure 3:
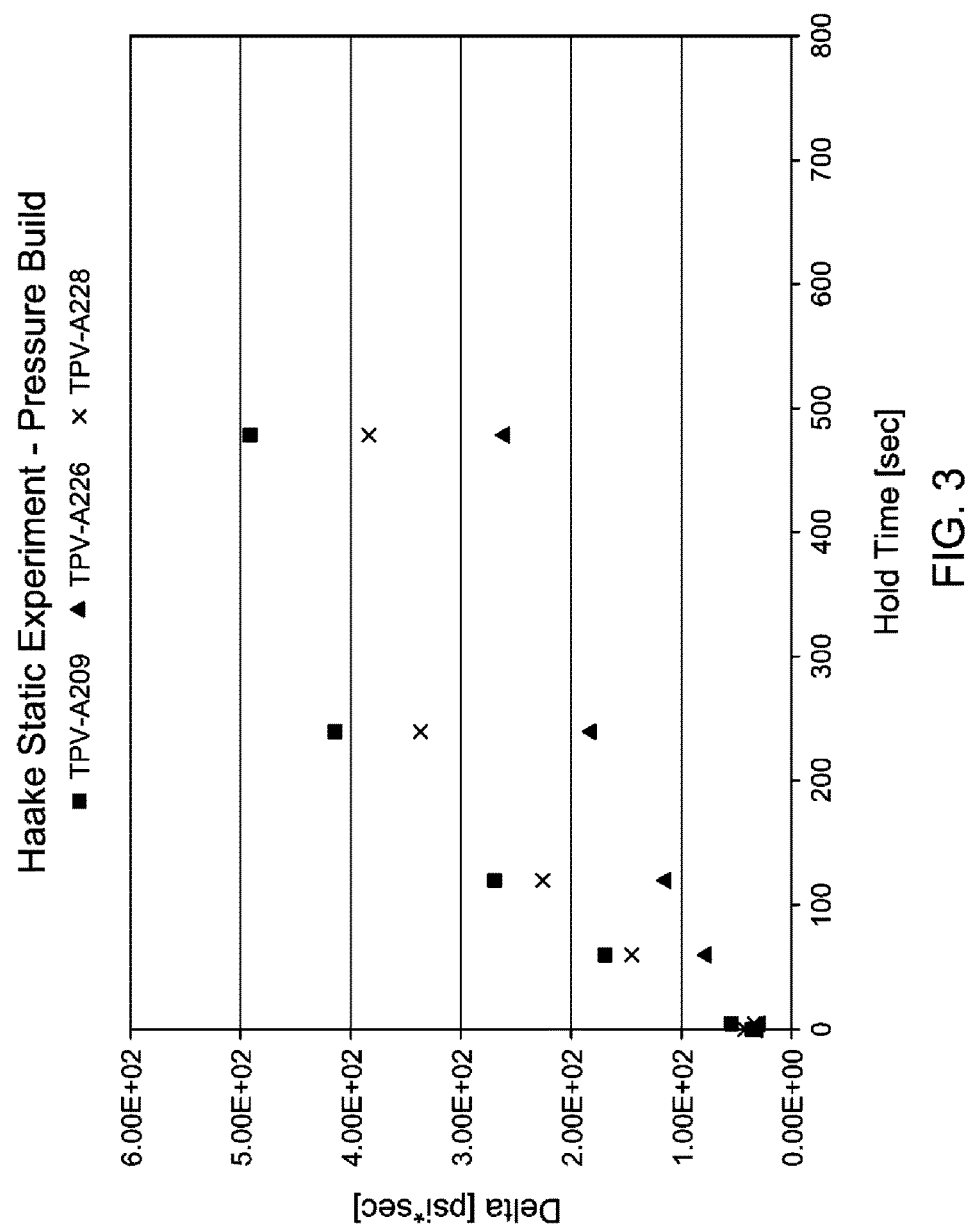

In general the longer the hold time t, the larger the resulting pressure build. However, as seen in FIGS. 2 and 3, the addition of the PBE reduced the Pressure Build Delta value as compared to the controls TPV-209 (FIG. 3) and TPV-210 (FIG. 2). A reduction in the Pressure Build Delta is consistent with the material requiring a longer period of time to develop melt stagnation or developing a lower total degree of melt stagnation. Thus, it would be expected that when forming end-use articles the TPVs containing the PBE would require a longer period of time to develop melt stagnation and/or develop a lower degree of melt stagnation when extruded at temperatures similar to those used in the Haake Static Experiment.

The melt extensional properties of some of the TPVs of Example 1 were also evaluated at different melt temperatures with the results shown in Table 5. The extensional properties were measured using a motor rpm of 9.9, and 10 tests were run for each sample, with the average being reported in Table 5. As seen in the break force data in Table 5, the addition of the PBE did not significantly impact the melt strength of the TPV. However, as seen in the extension ratio data in Table 5, there was an increase in the melt strain at break for the TPVs that contained the PBE. The improvement in the melt strain at break could be particular beneficial in chemical foaming applications as it could widen the process window at which the foaming of the TPV could take place.

TABLE 5

Example 1 TPV Extensional Properties

| TPV | Melt Temp. (° C.) | Die Pressure (psi) | Extrusion Rate (g/min) | Break Force (Average) (N) | Break Force (Std. Dev.) (N) | Extension Ratio (Average) | Extension Ratio (Std. Dev.) |
|---|---|---|---|---|---|---|---|
| TPV-A210 | 173 | 1950 | 4.87 | 0.38 | 0.02 | 2.17 | 0.12 |
| TPV-A210 | 183 | 1396 | 5.05 | 0.38 | 0.34 | 2.72 | 0.27 |
| TPV-A210 | 192 | 1119 | 3.82 | 0.12 | 0.01 | 5.73 | 0.32 |
| TPV-A210 | 203 | 1043 | 3.73 | 0.75 | 0.00 | 6.13 | 0.58 |
| TPV-A213 | 172 | 1940 | 4.41 | 0.34 | 0.02 | 2.16 | 0.15 |
| TPV-A213 | 183 | 1413 | 4.82 | 0.36 | 0.02 | 2.74 | 0.21 |
| TPV-A213 | 192 | 1121 | 3.71 | 0.10 | 0.00 | 5.95 | 0.45 |
| TPV-A213 | 202 | 1060 | 3.73 | 0.07 | 0.00 | 6.39 | 0.33 |
| TPV-A214 | 173 | 1791 | 4.27 | 0.30 | 0.01 | 2.26 | 0.18 |
| TPV-A214 | 182 | 1290 | 4.52 | 0.42 | 0.03 | 3.54 | 0.20 |
| TPV-A214 | 193 | 1094 | 3.93 | 0.08 | 0.00 | 6.75 | 0.65 |
| TPV-A214 | 203 | 1037 | 3.94 | 0.06 | 0.00 | 8.56 | 0.60 |
| TPV-A215 | 171 | 1796 | 4.06 | 0.33 | 0.02 | 2.40 | 0.19 |
| TPV-A215 | 182 | 1223 | 4.85 | 0.38 | 0.02 | 3.49 | 0.24 |
| TPV-A215 | 191 | 1043 | 4.11 | 0.05 | 0.00 | 6.30 | 0.68 |
| TPV-A215 | 202 | 991 | 4.09 | 0.04 | 0.00 | 7.17 | 0.88 |
| TPV-A216 | 183 | 1188 | 4.93 | 0.31 | 0.02 | 3.84 | 0.25 |
| TPV-A218 | 183 | 1228 | 4.68 | 0.38 | 0.01 | 3.67 | 0.17 |
| TPV-A219 | 172 | 1768 | 4.41 | 0.31 | 0.02 | 2.09 | 0.17 |
| TPV-A219 | 183 | 1236 | 4.89 | 0.42 | 0.01 | 3.51 | 0.22 |
| TPV-A219 | 191 | 1041 | 4.02 | 0.06 | 0.00 | 6.99 | 0.48 |
| TPV-A219 | 202 | 996 | 4.07 | 0.06 | 0.00 | 6.96 | 0.36 |
| TPV-A220 | 183 | 1310 | 4.98 | 0.42 | 0.07 | 3.13 | 0.39 |

Extruded tapes were made from the TPVs using a Die C (Chicane die) Test with the processing conditions, extruder zone and die temperatures, listed in Table 6. The extruder used in the had a 30:1 length:diameter ratio, and was operated at the screw speed noted in Table 6 for a run time of two hours. Die pressure, extruder throughput, and motor amperage were recorded throughout the test, with the values reported in Table 6. The gloss of each tape was measured with the results in Table 7. The extruded tapes were also visually inspected for the appearance of surface defects and occlusions, such as surface spots and die lines. By visual inspection, the tapes made from TPV-A225, TPV-A226, TPV-A227, and TPV-A228 exhibited decreased surface defects, mars, lines and/or occlusions as compared to the tapes made from TPV-A209, TPV-A221, TPV-A222, TPV-A223, and TPV-A224. Likewise, by visual inspection, the tapes made from TPV-A216, TPV-A217, TPV-A218, and TPV-A219 exhibited decreased surface imperfections as compared to the tapes made from TPV-A210, TPV-A213, TPV-A214, TPV-A215, and TPV-A220.

TABLE 6

Extruded Part Process Conditions

| | Extruder Set Point | TPV-A210 | TPV-A213 | TPV-A214 | TPV-A215 | TPV-A216 | TPV-A217 | TPV-A218 | TPV-A219 | TPV-A220 | TPV-A209 | TPV-A221 | TPV-A222 | TPV-A223 | TPV-A224 | TPV-A225 | TPV-A226 | TPV-A227 | TPV-A228 |
|---|---|---|---|---|---|---|---|---|---|---|---|---|---|---|---|---|---|---|---|
| Extruder Zone 1 Temp. (° C.) | 340 | 340 | 340 | 340 | 340 | 340 | 340 | 340 | 340 | 340 | 340 | 340 | 340 | 340 | 340 | 340 | 340 | 340 | 340 |

TABLE 6-continued

Extruded Part Process Conditions

| Extruder Set Point | TPV-A210 | TPV-A213 | TPV-A214 | TPV-A215 | TPV-A216 | TPV-A217 | TPV-A218 | TPV-A219 | TPV-A220 | TPV-A209 | TPV-A221 | TPV-A222 | TPV-A223 | TPV-A224 | TPV-A225 | TPV-A226 | TPV-A227 | TPV-A228 |
|---|---|---|---|---|---|---|---|---|---|---|---|---|---|---|---|---|---|---|
| Extruder Zone 2 Temp. (° C.) | 360 | 360 | 360 | 360 | 360 | 360 | 360 | 360 | 360 | 360 | 360 | 360 | 360 | 360 | 360 | 360 | 360 | 360 | 360 |
| Extruder Zone 3 Temp. (° C.) | 370 | 370 | 370 | 370 | 370 | 370 | 370 | 370 | 370 | 370 | 370 | 370 | 370 | 370 | 370 | 370 | 370 | 370 | 370 |
| Extruder Zone 4 Temp. (° C.) | 380 | 380 | 380 | 380 | 380 | 380 | 380 | 380 | 380 | 379 | 380 | 380 | 380 | 380 | 380 | 380 | 380 | 380 | 380 |
| Die Zone 1 Temp. (° C.) | 390 | 390 | 390 | 390 | 390 | 390 | 390 | 390 | 390 | 390 | 390 | 390 | 390 | 390 | 390 | 390 | 390 | 390 | 390 |
| Die Zone 2 Temp. (° C.) | 400 | 410 | 411 | 407 | 410 | 405 | 411 | 405 | 411 | 409 | 409 | 407 | 408 | 407 | 407 | 408 | 406 | 408 | 408 |
| Die Zone 3 Temp. (° C.) | 400 | 409 | 407 | 405 | 406 | 406 | 406 | 409 | 410 | 406 | 408 | 408 | 409 | 408 | 409 | 407 | 409 | 406 | 408 |
| Die Pressure (psi) | — | 410 | 400 | 460 | 430 | 380 | 370 | 360 | 400 | 490 | 410 | 390 | 460 | 460 | 410 | 350 | 350 | 400 | 460 |
| AMPS | — | 27.8 | 27.2 | 26.4 | 26.4 | 25.7 | 25.4 | 25.5 | 24.8 | 26 | 27.1 | 25.2 | 26.1 | 26.9 | 26.9 | 25.9 | 24.7 | 25 | 25.1 |
| Screw Speed (rpm) | — | 31 | 31 | 31 | 31 | 31 | 31 | 31 | 31 | 31 | 31 | 31 | 31 | 31 | 31 | 31 | 31 | 31 | 31 |

TABLE 7

Extruded Part Physical Characteristics

| | TPV-A213 | TPV-A214 | TPV-A215 | TPV-A216 | TPV-A217 | TPV-A218 | TPV-A219 | TPV-A220 | TPV-A209 | TPV-A221 | TPV-A222 | TPV-A223 | TPV-A224 | TPV-A225 | TPV-A226 | TPV-A227 | TPV-A228 |
|---|---|---|---|---|---|---|---|---|---|---|---|---|---|---|---|---|---|
| Gloss at 20° | 0.2 | 0.2 | 0.3 | 0.6 | 0.4 | 0.3 | 0.3 | 0.2 | 0.2 | 0 | 0.3 | 0.3 | 0.5 | 0.7 | 0.5 | 0.3 | 0.2 |
| Gloss at 60° | 2.5 | 2.8 | 4.9 | 9.1 | 6.3 | 5.1 | 4.6 | 3 | 2.1 | 0 | 5.2 | 6 | 8.2 | 11.3 | 7.3 | 4.7 | 3.8 |

Example 2

In Example 2, an additional Haake Static Experiment was undertaken using TPVs having the formulations of Example 1. The Haake Static Experiment of Example 2 took place according to the same method as described with reference to Example 1, except that the extruder zone temperatures were increased as compared to Example 1. Instead of the extruder zone temperatures described in Example 1, in Example 2 the extruder zone temperatures were set to 180° C. (Zone 1), 200° C. (Zone 2), 200° C. (Zone 3), 200° C. (Die).

Figure 4:
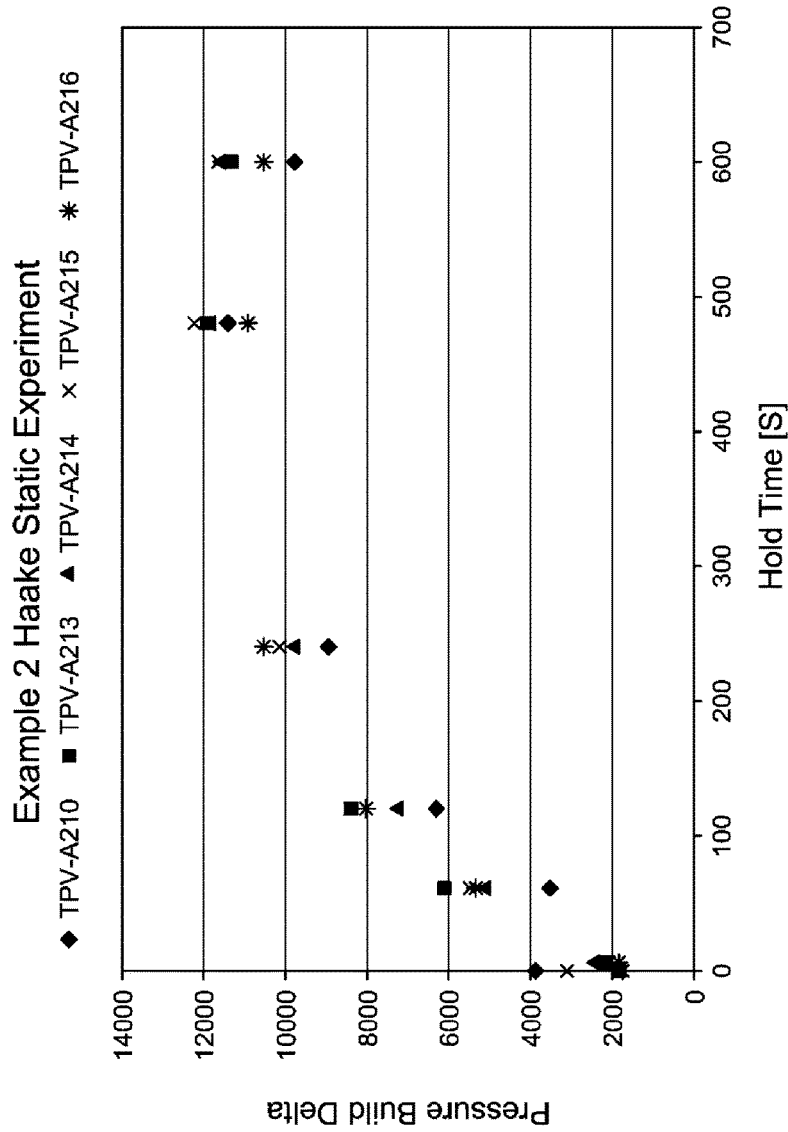
FIGS. 4 and 5 show the change in the pressure build in the Haake Static Experiment for TPVs of Example 2.
Figure 5:
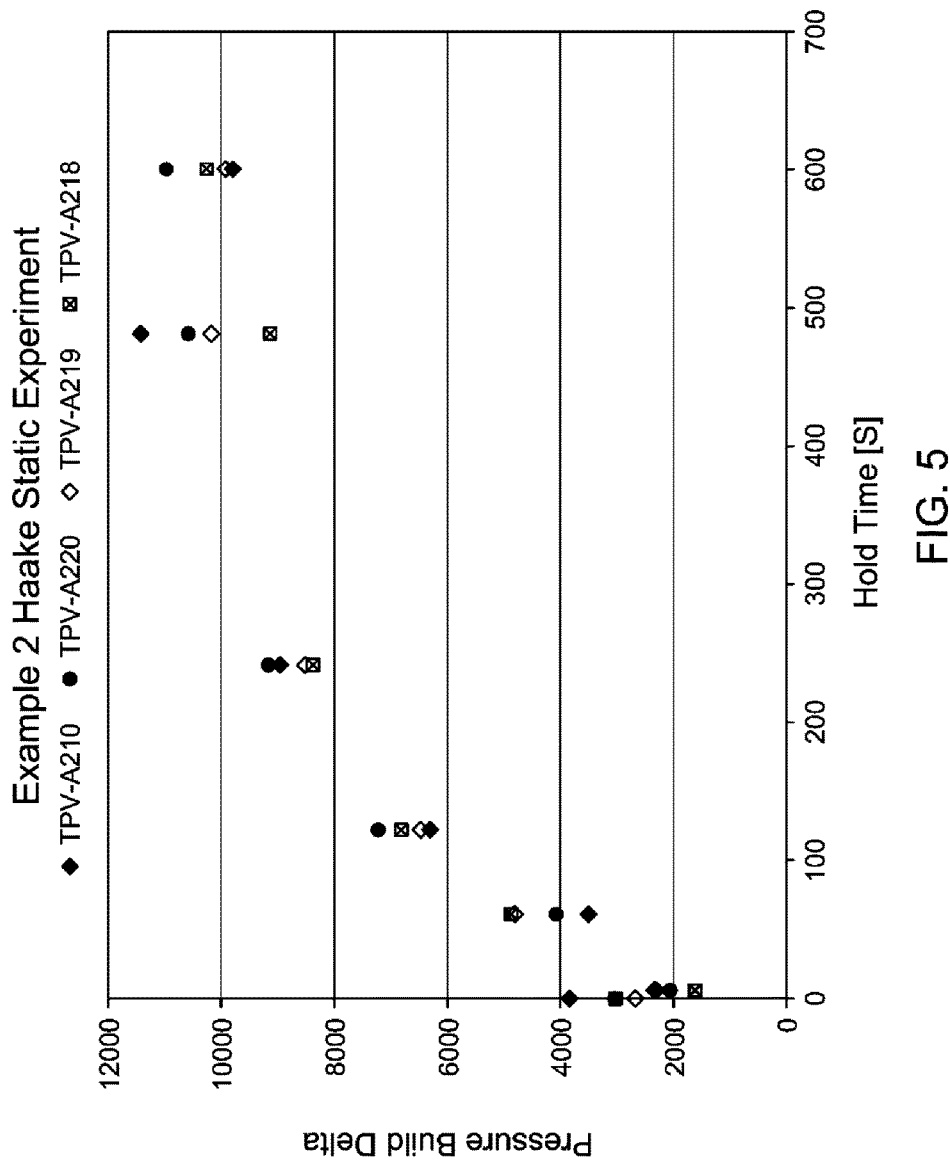
Figure 6:
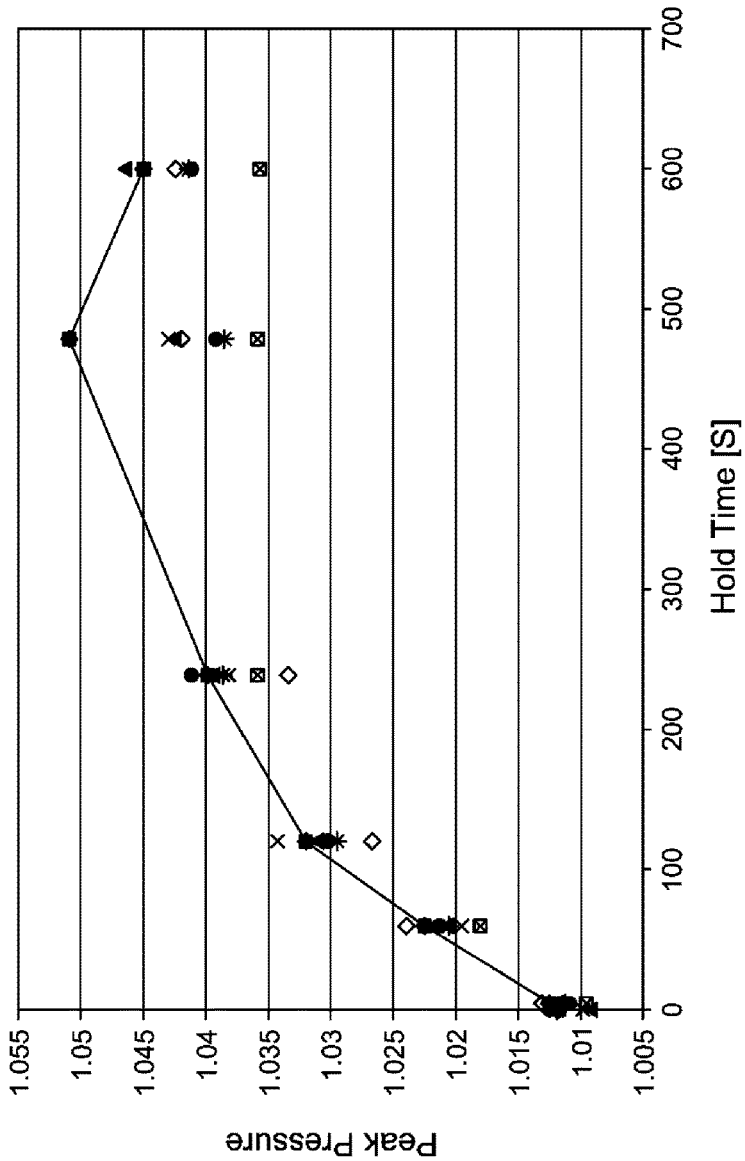
FIG. 6 shows the peak pressure exhibited in the Haake Static Experiment for TPVs of Example 2.

The changes in the pressure build in the Haake Static Experiment in Example 2 are shown in FIGS. 4 and 5. The reduction of the pressure build delta seen in Example 1 was not seen for all of the TPV samples in FIGS. 4 and 5 at the higher extrusion temperatures used in Example 2. However, as seen in FIG. 6, the TPVs containing the PBE tended to have a decreased peak pressure spike during the Haake Static Experiment as compared to the control TPV-A210 (particularly at longer hold times).

Example 3

TPVs were prepared by dynamically mixing and vulcanizing in a twin-screw extruder the formulations described in Table 8 using a process similar to that of Example 1. As compared to the process of Example 1, the extruder used in Example 3 had a diameter that was approximately 2.2 times the diameter of the extruder used in Example 1, and the extrusion temperatures were adapted to adjust for the larger extruder diameter. Like in Example 1, the thermoplastic resin, PBE, granulated rubber, clay, zinc oxide, $SnCl_2$ masterbatch, and carbon black masterbatch were added to the extruder at the feed throat. The phenolic resin-in-oil was injected into the extruder after the feed throat and initial mixing zone. A first portion ("Oil #3") of the free oil was introduced to the extruder after the feed throat but before the phenolic resin-in-oil injection point and a second portion ("Oil #4") of the free process oil was introduced to the extruder after the phenolic resin-in-oil injection point.

The formulations in Table 8 describe the amount of each ingredient in the formulation as parts per hundred parts of rubber ("phr"). Table 9 lists the formulations from Table 8 by the weight percent of each material type, e.g., rubber, thermoplastic resin, etc., in the thermoplastic vulcanizate, where the weight percent of the material type was calculated using the ingredients in Table 8.

Table 10 shows the relative contribution of the main components to the continuous phase. Thus, Table 10 shows the relative amounts of each polypropylene (that was not part of a masterbatch) and the PBEs to the TPV continuous phase.

The TPV compositions of Example 3 were also tested for a variety of physical properties, with the results shown in Table 11. As seen in Table 11, the addition of the PBE resulted in an improvement in the ultimate elongation of the TPV as compared to the control TPVs, TPV-P01 and TPV-P10. Also, as seen in Table 11, the Shore A hardness and LCR capillary rheometer viscosity were not significantly affected by the addition of the PBE.

TABLE 8

Example 3 Formulations by Ingredients in phr

| Ingredient | TPV-P01 | TPV-P02 | TPV-P03 | TPV-P04 | TPV-P05 | TPV-P06 | TPV-P07 | TPV-P08 | TPV-P09 | TPV-P10 |
|---|---|---|---|---|---|---|---|---|---|---|
| V3666 | 175 | 175 | 175 | 175 | 175 | 175 | 175 | 175 | 175 | 175 |
| PP5341 | 28.92 | 28.43 | 27.91 | 27.42 | 26.91 | 28.42 | 27.91 | 27.42 | 26.91 | 28.91 |
| PPF180A | 10.8 | 10.8 | 10.8 | 10.8 | 10.8 | 10.8 | 10.8 | 10.8 | 10.8 | 10.8 |
| VM3000 | 0 | 7.16 | 14.61 | 22.34 | 30.39 | 0 | 0 | 0 | 0 | 0 |
| VM3020 | 0 | 0 | 0 | 0 | 0 | 7.16 | 14.61 | 22.34 | 30.39 | 0 |
| Black MB | 24 | 24 | 24 | 24 | 24 | 24 | 24 | 24 | 24 | 24 |
| Oil #3 | 5.8 | 5.8 | 5.8 | 5.8 | 5.8 | 5.8 | 5.8 | 5.8 | 5.8 | 5.8 |
| Oil #4 | 52.33 | 52.33 | 52.33 | 52.33 | 52.33 | 52.33 | 52.33 | 52.33 | 52.33 | 52.33 |
| Clay | 42 | 42 | 42 | 42 | 42 | 42 | 42 | 42 | 42 | 42 |
| RIO | 9.49 | 9.5 | 9.5 | 9.5 | 9.5 | 9.5 | 9.5 | 9.49 | 9.5 | 9.49 |
| ZnO | 1.5 | 1.5 | 1.5 | 1.5 | 1.5 | 1.5 | 1.5 | 1.5 | 1.5 | 1.5 |
| SnCl$_2$ MB | 1.67 | 1.67 | 1.67 | 1.67 | 1.67 | 1.67 | 1.67 | 1.67 | 1.67 | 1.67 |
| Total phr | 351.51 | 358.19 | 365.12 | 372.36 | 379.9 | 358.18 | 365.12 | 372.35 | 379.9 | 351.5 |

TABLE 9

Example 3 Formulations by Material Type in Weight Percent

| Ingredient | TPV-P01 | TPV-P02 | TPV-P03 | TPV-P04 | TPV-P05 | TPV-P06 | TPV-P07 | TPV-P08 | TPV-P09 | TPV-P10 |
|---|---|---|---|---|---|---|---|---|---|---|
| Rubber | 28.45 | 27.92 | 27.39 | 26.86 | 26.32 | 27.92 | 27.39 | 26.86 | 26.32 | 28.45 |
| Thermoplastic Resin | 15.50 | 15.08 | 14.65 | 14.23 | 13.82 | 15.08 | 14.65 | 14.23 | 13.82 | 15.50 |
| PBE | 0.00 | 2.00 | 4.00 | 6.00 | 8.00 | 2.00 | 4.00 | 6.00 | 8.00 | 0.00 |
| Oil | 39.76 | 39.02 | 38.28 | 37.54 | 36.79 | 39.03 | 38.28 | 37.54 | 36.79 | 39.76 |
| Clay | 11.95 | 11.73 | 11.50 | 11.28 | 11.06 | 11.73 | 11.50 | 11.28 | 11.06 | 11.95 |
| Carbon Black | 2.81 | 2.75 | 2.70 | 2.65 | 2.60 | 2.75 | 2.70 | 2.65 | 2.60 | 2.81 |
| Phenolic Resin | 0.81 | 0.80 | 0.78 | 0.77 | 0.75 | 0.80 | 0.78 | 0.76 | 0.75 | 0.81 |
| Zinc Oxide | 0.43 | 0.42 | 0.41 | 0.40 | 0.39 | 0.42 | 0.41 | 0.40 | 0.39 | 0.43 |
| SnCl$_2$ | 0.21 | 0.21 | 0.21 | 0.20 | 0.20 | 0.21 | 0.21 | 0.20 | 0.20 | 0.21 |
| Kenamide | 0.07 | 0.07 | 0.07 | 0.06 | 0.06 | 0.07 | 0.07 | 0.06 | 0.06 | 0.07 |
| Primary AO | 0.02 | 0.02 | 0.02 | 0.02 | 0.02 | 0.02 | 0.02 | 0.02 | 0.02 | 0.02 |

TABLE 10

Relative Plastic Content of Continuous Phase of Example 3 TPVs

| Ingredient | TPV-P01 | TPV-P02 | TPV-P03 | TPV-P04 | TPV-P05 | TPV-P06 | TPV-P07 | TPV-P08 | TPV-P09 | TPV-P10 |
|---|---|---|---|---|---|---|---|---|---|---|
| PP5341 | 72.8% | 61.9% | 53.8% | 47.6% | 42.6% | 61.9% | 53.8% | 47.6% | 42.6% | 72.8% |
| PPF180A | 27.2% | 23.1% | 20.1% | 17.8% | 15.9% | 23.1% | 20.1% | 17.8% | 15.9% | 27.2% |
| VM3000 | 0.0% | 15.0% | 26.1% | 34.7% | 41.5% | 0.0% | 0.0% | 0.0% | 0.0% | 0.0% |
| VM3020 | 0.0% | 0.0% | 0.0% | 0.0% | 0.0% | 15.0% | 26.1% | 34.7% | 41.5% | 0.0% |

TABLE 11

Example 3 TPV Physical Properties

| | TPV-P01 | TPV-P02 | TPV-P03 | TPV-P04 | TPV-P05 | TPV-P06 | TPV-P07 | TPV-P08 | TPV-P09 | TPV-P10 |
|---|---|---|---|---|---|---|---|---|---|---|
| Specific Gravity | 0.9773 | 0.9779 | 0.9808 | 0.9717 | 0.9671 | 0.9751 | 0.9746 | 0.9668 | 0.9665 | 0.9758 |
| Hardness (Shore A) | 72.0 | 73.3 | 73.7 | 73.5 | 73.4 | 72.5 | 73.5 | 73.1 | 74.0 | 72.4 |
| ESR (Ra) | 49.2 | 48.6 | 46.9 | 30.4 | 23.3 | 51.1 | 39.8 | 33.6 | 28.8 | 48.0 |
| UTS (MPa) | 6.49 | 7.24 | 6.84 | 3.82 | 7.83 | 7.26 | 7.96 | 7.95 | 8.52 | 6.82 |
| M100 (MPa) | 2.77 | 2.92 | 2.97 | 2.97 | 2.95 | 2.88 | 2.99 | 2.00 | 3.01 | 2.86 |

TABLE 11-continued

Example 3 TPV Physical Properties

| | TPV-P01 | TPV-P02 | TPV-P03 | TPV-P04 | TPV-P05 | TPV-P06 | TPV-P07 | TPV-P08 | TPV-P09 | TPV-P10 |
|---|---|---|---|---|---|---|---|---|---|---|
| UE (%) | 461 | 510 | 494 | 508 | 586 | 511 | 555 | 566 | 571 | 460 |
| LCR @ 1200/s (Pa · s) | 73.9 | 73.5 | 74.2 | 71.3 | 71.9 | 74.2 | 74.9 | 73.6 | 72.4 | 74.6 |
| C-Set, 22 hrs @ 70° C. | 29.1 | 32.3 | 35.9 | 37.3 | 38 | 32.4 | 33 | 39 | 42.4 | 42.4 |
| C-Set, 70 hrs @ 125° C. | 43.6 | 46.1 | 48.6 | 47.9 | 58.1 | 50.9 | 51.3 | 56.3 | 58.4 | 46.9 |

Figure 7:
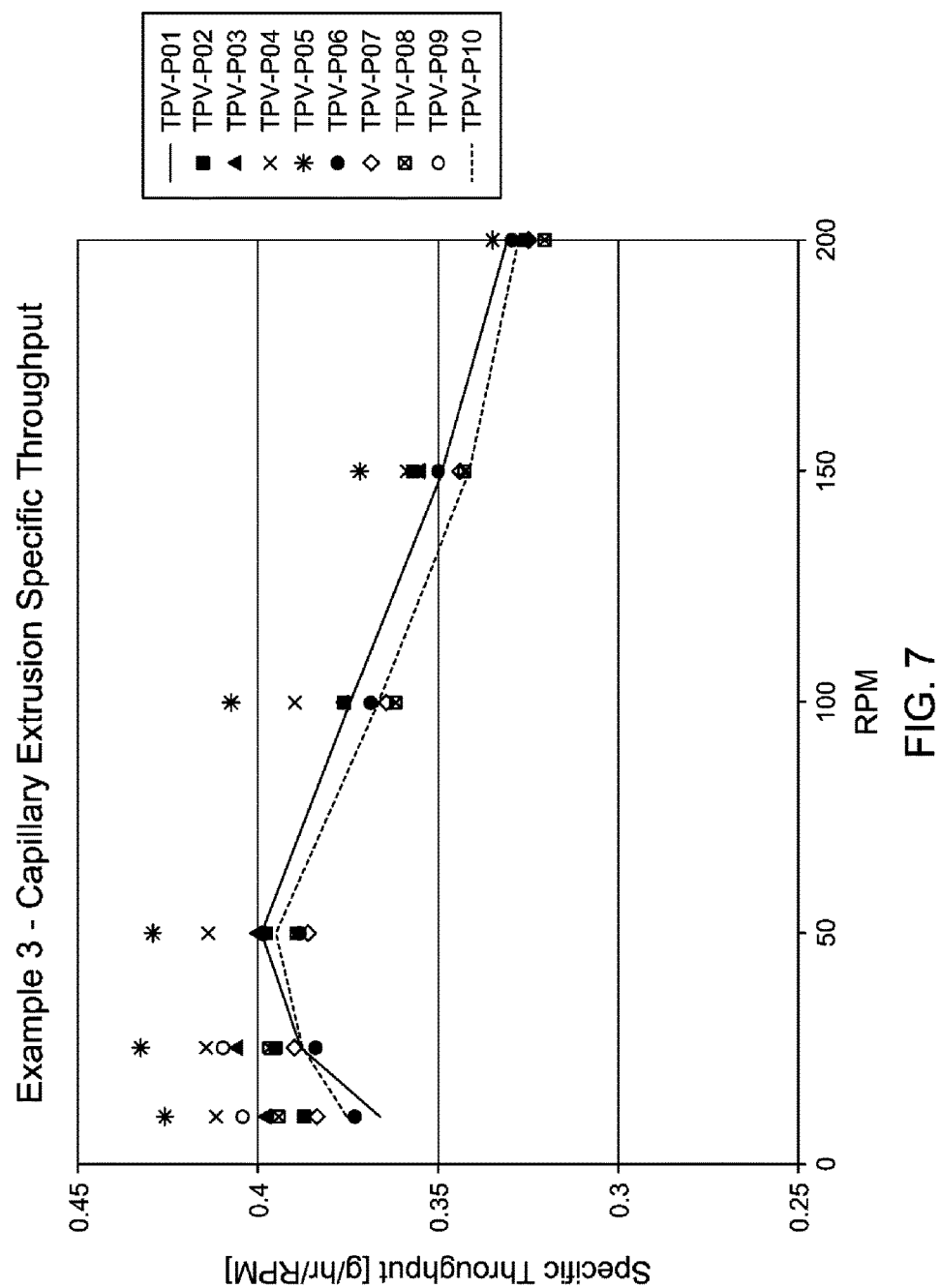
FIG. 7 shows the capillary extrusion specific throughput for TPVs of Example 3.

The extrusion properties of the TPVs of Example 3 were also tested in a capillary extrusion test. The Haake capillary extrusion data was obtained using a Haake PolyLab system as in Example 1, except that the zone set points were 180/200/200/200/200. The results of the capillary extrusion test are shown in Tables 12A and 12B. Table 13 shows the normalized results of the capillary extrusion test, where the pressure was normalized by the content of the PBE in the TPV. FIG. 7 shows the specific rate in (g/hr/rpm) of the TPVs in the capillary extrusion data when extruding the TPV at a one minute cut rate.

TABLE 12A

Example 3 Capillary Extrusion Results

| TPV | RPM | Rate (g/min) | Die Melt Temp (° C.) | Torque (N*m) | Die Exit Pressure (psi) | Motor Load (%) |
|---|---|---|---|---|---|---|
| TPV-P01 | 10 | 3.64 | 202 | 9.44 | 1020.77 | 5.90 |
| TPV-P01 | 25 | 9.71 | 203 | 12.89 | 1219.47 | 8.06 |
| TPV-P01 | 50 | 19.91 | 203 | 16.61 | 1388.75 | 10.37 |
| TPV-P01 | 100 | 37.43 | 203 | 21.57 | 1547.53 | 13.48 |
| TPV-P01 | 150 | 52.25 | 203 | 23.6 | 1631.14 | 14.76 |
| TPV-P01 | 200 | 66.17 | 203 | 25.19 | 1687.75 | 15.75 |
| TPV-P02 | 10 | 3.84 | 203 | 9.25 | 1021.07 | 5.78 |
| TPV-P02 | 25 | 9.86 | 203 | 12.68 | 1230.75 | 7.92 |
| TPV-P02 | 50 | 19.88 | 203 | 16.08 | 1387.27 | 10.06 |
| TPV-P02 | 100 | 37.67 | 203 | 21.32 | 1560.32 | 13.32 |
| TPV-P02 | 150 | 53.59 | 203 | 23.89 | 1651.18 | 14.94 |
| TPV-P02 | 200 | 65.18 | 203 | 25.83 | 1710.04 | 16.13 |
| TPV-P03 | 10 | 3.95 | 203 | 8.75 | 987.86 | 5.47 |
| TPV-P03 | 25 | 10.16 | 203 | 12.08 | 1199.39 | 7.55 |
| TPV-P03 | 50 | 19.96 | 203 | 15.58 | 1363.36 | 9.74 |
| TPV-P03 | 100 | 37.7 | 203 | 20.74 | 1531.64 | 12.96 |
| TPV-P03 | 150 | 53.42 | 203 | 23.30 | 1622 | 14.56 |
| TPV-P03 | 200 | 65.97 | 203 | 25.03 | 1685.89 | 15.65 |
| TPV-P04 | 10 | 4.08 | 203 | 8.30 | 960.63 | 5.18 |
| TPV-P04 | 25 | 10.34 | 203 | 11.85 | 1188.1 | 7.41 |
| TPV-P04 | 50 | 20.65 | 202 | 15.76 | 1355.8 | 9.85 |
| TPV-P04 | 100 | 38.93 | 203 | 20.69 | 1531.47 | 12.94 |
| TPV-P04 | 150 | 53.78 | 203 | 23.26 | 1623.5 | 14.54 |
| TPV-P04 | 200 | 66.99 | 203 | 25.02 | 1694.8 | 15.64 |
| TPV-P05 | 10 | 4.22 | 203 | 8.3 | 948.55 | 5.19 |
| TPV-P05 | 25 | 10.8 | 203 | 12.09 | 1187.37 | 7.55 |
| TPV-P05 | 50 | 21.4 | 203 | 15.79 | 1358.86 | 9.88 |
| TPV-P05 | 100 | 40.72 | 203 | 21.54 | 1543.77 | 13.46 |
| TPV-P05 | 150 | 55.75 | 203 | 24.08 | 1644.9 | 15.04 |
| TPV-P05 | 200 | 67.01 | 203 | 25.13 | 1698.22 | 15.71 |

TABLE 12B

Example 3 Capillary Extrusion Results

| TPV | RPM | Rate (g/min) | Die Melt Temp (° C.) | Torque (N*m) | Die Exit Pressure (psi) | Motor Load (%) |
|---|---|---|---|---|---|---|
| TPV-P06 | 10 | 3.7 | 202 | 9.81 | 1003.39 | 6.13 |
| TPV-P06 | 25 | 9.59 | 202 | 13.08 | 1207.17 | 8.17 |
| TPV-P06 | 50 | 19.4 | 203 | 16.44 | 1388.8 | 10.26 |
| TPV-P06 | 100 | 36.86 | 202 | 21.64 | 1528.73 | 13.52 |
| TPV-P06 | 150 | 52.43 | 202 | 24.64 | 1619.03 | 15.4 |
| TPV-P06 | 200 | 65.84 | 202 | 26.15 | 1675.87 | 16.33 |
| TPV-P07 | 10 | 3.8 | 202 | 9.68 | 1025.2 | 6.05 |
| TPV-P07 | 25 | 9.73 | 203 | 13.21 | 1231.97 | 8.25 |
| TPV-P07 | 50 | 19.25 | 204 | 16.30 | 1405.68 | 10.18 |
| TPV-P07 | 100 | 36.39 | 203 | 21.43 | 1549.57 | 13.39 |
| TPV-P07 | 150 | 51.54 | 203 | 24.18 | 1641.3 | 15.11 |
| TPV-P07 | 200 | 64.9 | 203 | 25.48 | 1701.69 | 15.93 |
| TPV-P08 | 10 | 3.91 | 203 | 9.64 | 1021.46 | 6.03 |
| TPV-P08 | 25 | 9.9 | 203 | 13.18 | 1231.57 | 8.23 |
| TPV-P08 | 50 | 19.49 | 202 | 16.72 | 1424.27 | 10.44 |
| TPV-P08 | 100 | 36.2 | 203 | 21.67 | 1555.68 | 13.54 |
| TPV-P08 | 150 | 51.41 | 203 | 24.27 | 1641.21 | 15.16 |
| TPV-P08 | 200 | 64.08 | 203 | 25.75 | 1698.38 | 16.08 |
| TPV-P09 | 10 | 4.01 | 203 | 9.26 | 1011.46 | 5.79 |
| TPV-P09 | 25 | 10.23 | 203 | 13.1 | 1234.64 | 8.19 |
| TPV-P09 | 50 | 19.76 | 203 | 16.87 | 1433.29 | 10.54 |
| TPV-P09 | 100 | 37.32 | 203 | 21.92 | 1569.61 | 13.71 |
| TPV-P09 | 150 | 52.23 | 203 | 24.62 | 1666.14 | 15.38 |
| TPV-P09 | 200 | 65.52 | 203 | 25.91 | 1719.61 | 16.19 |
| TPV-P10 | 10 | 3.72 | 203 | 9.20 | 956.19 | 5.75 |
| TPV-P10 | 25 | 9.68 | 203 | 12.62 | 1157.17 | 7.89 |
| TPV-P10 | 50 | 19.72 | 204 | 16.05 | 1347.63 | 10.04 |
| TPV-P10 | 100 | 36.65 | 203 | 20.56 | 1478.83 | 12.86 |
| TPV-P10 | 150 | 51.23 | 203 | 22.82 | 1565.3 | 14.26 |
| TPV-P10 | 200 | 65.46 | 203 | 24.25 | 1624.87 | 15.15 |

As seen in Tables 12A, 12B, and 13, when extruding the Example 3 TPVs the pressure was always within a few percent of the control TPVs, TPV-P01 and TPV-P10. Despite the small changes in pressure as compared to the controls, the pressure slightly increased for the TPVs that contained VM3020 as the PBE, where the pressure of the TPVs that contained VM3000 decreased or remained constant. At low shear rates, e.g., 10 RPM, the TPVs containing 8 wt % of VM3000 (TPV-P05) had a reduced pressure relative to the control. Further, as seen in FIG. 7 there was an improvement in the specific throughput when extruding the TPVs that contained PBE, and in particular for those that contained the VM3000 PBE.

TABLE 13

Example 3 Capillary Extrusion Normalized Pressure Change
Normalized Pressure Change (Px/Po)

| | 0 | 2% | 4% | 6% | 8% |
|---|---|---|---|---|---|
| | | % VM3000 | | | |
| 10 rpm | 100% | 100% | 97% | 94% | 93% |
| 25 rpm | 100% | 101% | 98% | 97% | 97% |
| 50 rpm | 100% | 100% | 98% | 98% | 98% |
| 100 rpm | 100% | 101% | 99% | 99% | 100% |
| 150 rpm | 100% | 101% | 99% | 100% | 101% |
| 200 rpm | 100% | 101% | 100% | 100% | 101% |
| | | % VM3020 | | | |
| 10 rpm | 100% | 98% | 100% | 100% | 99% |
| 25 rpm | 100% | 99% | 101% | 101% | 101% |
| 50 rpm | 100% | 100% | 101% | 103% | 103% |
| 100 rpm | 100% | 99% | 100% | 101% | 101% |
| 150 rpm | 100% | 99% | 101% | 101% | 102% |
| 200 rpm | 100% | 99% | 101% | 101% | 102% |

Notes
Px = Pressure at x % VM
Po = Pressure at 0% VM

Figure 8:
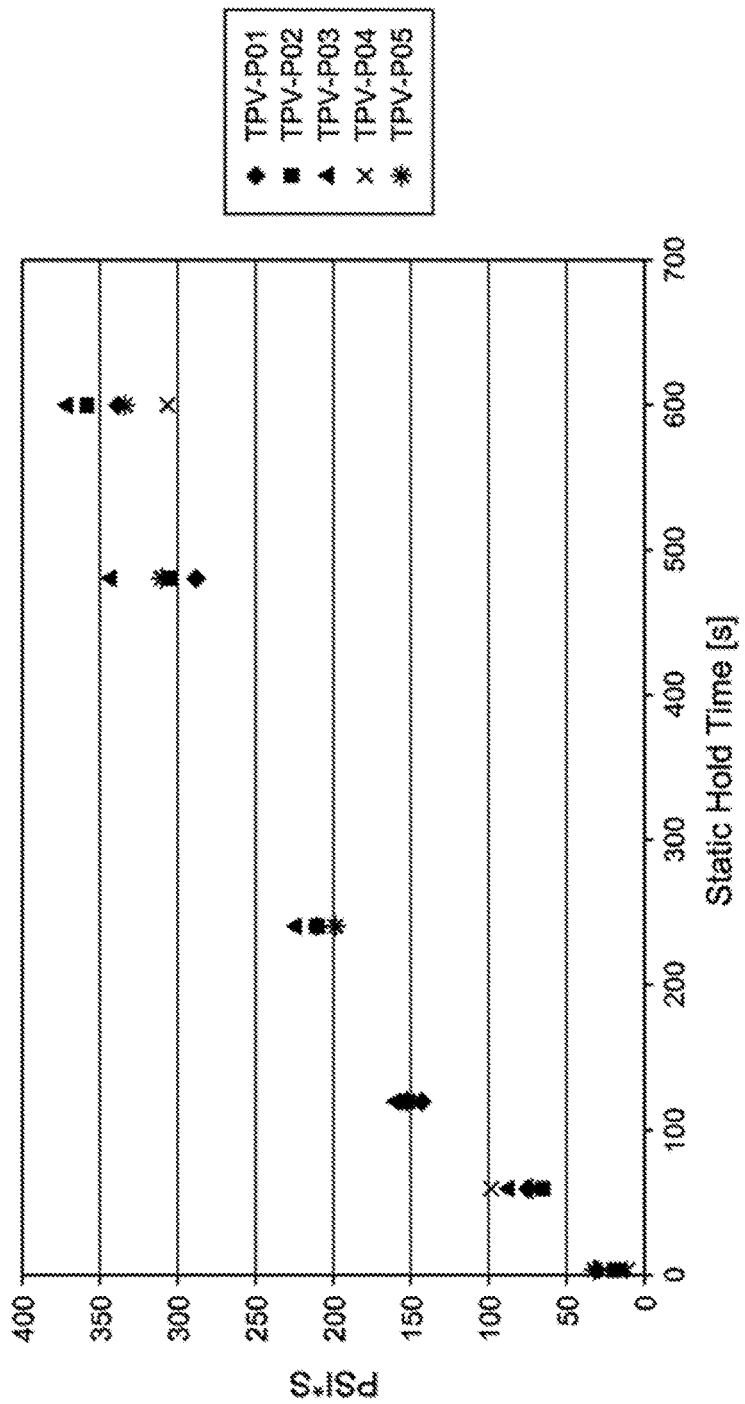
FIGS. 8 and 9 show the change in the pressure build in the Haake Static Experiment for TPVs of Example 3.
Figure 9:
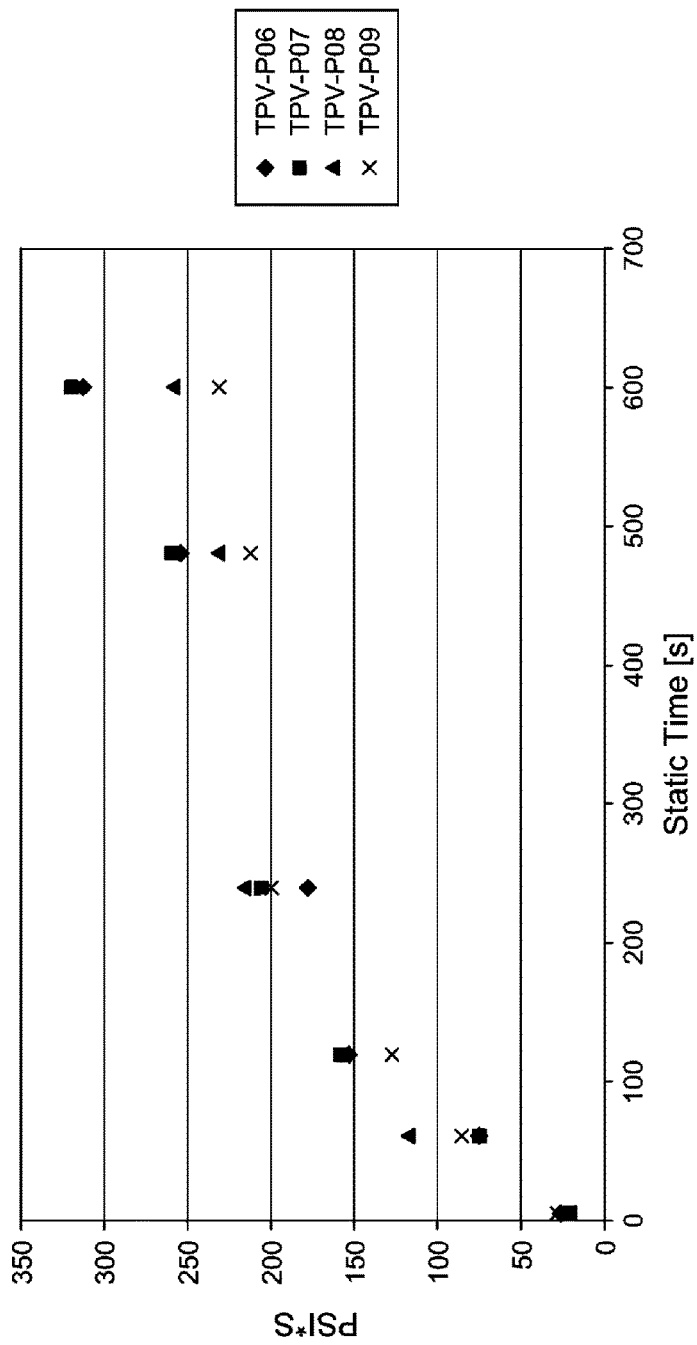

A Haake Static Experiment was undertaken using the TPVs from Example 3. The Haake Static Experiment of Example 3 took place according to the method as described with reference to Example 2, and used the extruder zone temperatures of Example 2: 180° C. (Zone 1), 200° C. (Zone 2), 200° C. (Zone 3), 200° C. (Die). The changes in the pressure build in the Haake Static Experiment in Example 3 are shown in FIGS. 8 and 9.

Example 4

Example 4 was undertaken to evaluate the difference between TPVs that were melt blended with a PBE (2-step materials) and TPVs that were made with the PBE (1-step materials). The 1-step TPVs were made by a process similar to that used in Example 1, with the formulations shown in Table 14 in phr. The formulations for TPV-N07 and TPV-N015 are the same, however, TPV-N015 was made using an extruder screw that enabled more aggressive mixing than that used with TPV-N07. Likewise, the extruder screw used to make TPV-N016 was the same as that used to make TPV-N016, and the screw used to make TPV-N08 was the same as that used to make TPV-N07.

TABLE 14

Formulations in phr for One Pass Materials of Example 4

| | TPV-N07 | TPV-N15 | TPV-N08 | TPV-N16 |
|---|---|---|---|---|
| V3666 | 175 | 175 | 175 | 175 |
| PP556E | 180 | 180 | 210 | 210 |
| VM3020 | 25 | 25 | 27.5 | 27.5 |
| Clay | 42 | 42 | 42 | 42 |
| Black MB | 17.4 | 17.4 | 17.4 | 17.4 |
| ZnO | 1.5 | 1.5 | 1.5 | 1.5 |
| SnCl$_2$ MB | 1.67 | 1.67 | 1.67 | 1.67 |
| RIO | 14.8 | 14.8 | 14.8 | 14.8 |
| Oil #1 | 12.6 | 12.6 | 12.6 | 12.6 |
| Oil #2 | 39.3 | 39.3 | 39.3 | 39.3 |
| Total phr | 509.27 | 509.27 | 541.77 | 541.77 |

Comparative two-step compositions were by compounding a vulcanized TPV with additional polypropylene and PBE. The formulations for the 2-step materials are listed in Table 15. To make the compositions of Table 15, TPVs were made utilizing the first step ingredients as described above. The TPVs were then blended in a Werner Pfleiderer ZSK-30 extruder at a melt temperature of less than 220° C. with the second step ingredients (namely additional polypropylene and propylene-based resin) as described in Table 15. The formulations for the compositions of Table 15 were set so that the total weight percent of the polypropylene and PBE would be the same as that in the corresponding formulations in Table 14. Physical properties of the different TPVs are shown in Table 16.

TABLE 15

Second Pass Materials

| | TPV-Z10 | TPV-Z20 |
|---|---|---|
| First Step Ingredients | | |
| V3666 | 175 | 175 |
| PP556E | 155 | 155 |
| Clay | 42 | 42 |
| Black MB | 17.4 | 17.4 |
| ZnO | 1.5 | 1.5 |
| SnCl$_2$ MB | 1.67 | 1.67 |
| RIO | 14.8 | 14.8 |
| Oil #1 (pre-cure) | 12.6 | 12.6 |
| Oil #2 (post-cure) | 39.3 | 39.3 |
| Second Step Ingredients | | |
| VM3020 | 27.5 | 25 |
| PP5341 | 55 | 25 |
| Total phr | 541.77 | 509.27 |

TABLE 16

Example 4 TPV Physical Properties

| | TPV-N16 | TPV-N08 | TPV-Z10 | TPV-N15 | TPV-N07 | TPV-Z20 |
|---|---|---|---|---|---|---|
| Hardness (Shore A) | 78 | 88 | 78.3 | 90 | 78 | 88.6 |
| C-Set, 22 hrs @ 70° C. | 55.7% | 60.3% | 58.2% | 53.8% | 50.9% | 51.9% |
| MD M100 (MPa) | 9.64 | 10.15 | 9.96 | 9.50 | 9.39 | 8.83 |
| MD UTS (MPa) | 22.17 | 23.06 | 24.29 | 20.71 | 20.95 | 20.75 |
| MD UE (%) | 575.14 | 583.03 | 627.86 | 544.74 | 565.52 | 596.12 |
| MD Break Energy | 8.69 | 9.31 | 10.46 | 7.83 | 8.24 | 8.42 |
| TD M100 (MPa) | 9.01 | 9.03 | 8.95 | 8.53 | 8.38 | 8.17 |
| TD UTS (MPa) | 20.75 | 21.29 | 22.47 | 18.97 | 19.82 | 19.69 |
| TD UE (%) | 573.40 | 599.39 | 637.49 | 549.36 | 595.16 | 597.59 |
| TD Break Energy | 8.03 | 8.63 | 9.66 | 7.17 | 7.98 | 7.90 |

Figure 10:
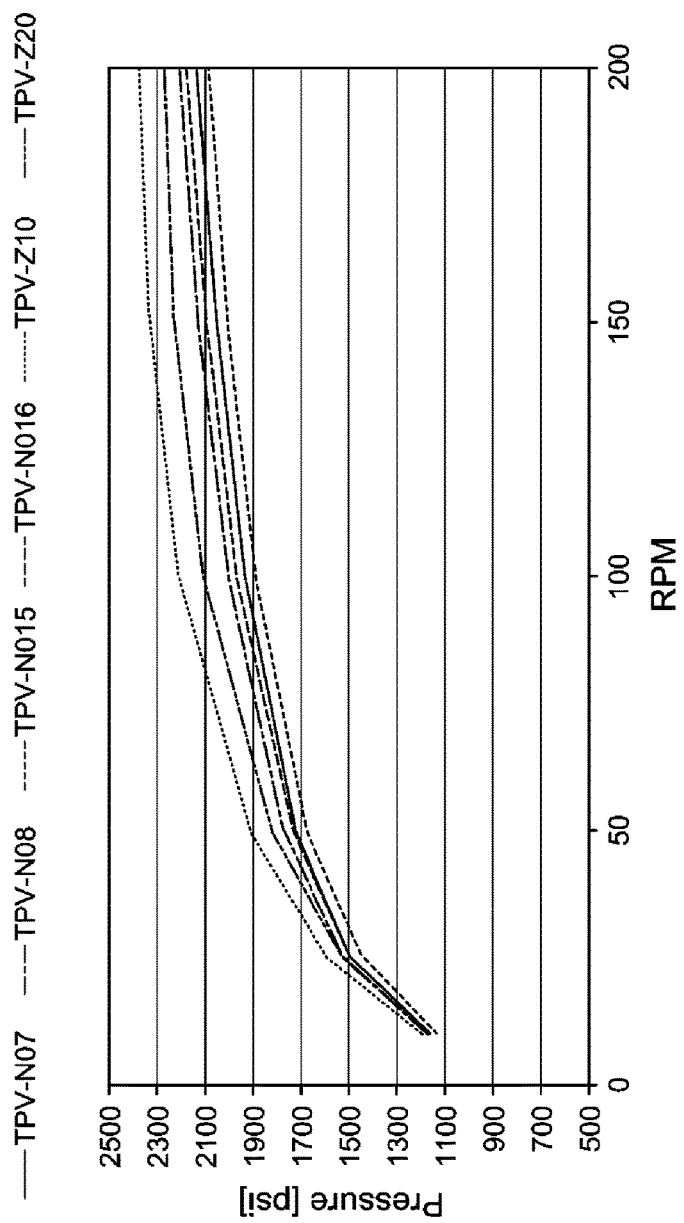
FIG. 10 shows the pressure exhibited in a Haake capillary extrusion of the TPVs of Example 4.

A Haake capillary extrusion test was conducted on the samples of Example 4 using a Haake PolyLab system as in Example 3, with the zone set points at 180/200/200/200/200. As seen in FIG. 10, the samples that were made in the two-step method exhibited greater extrusion pressure as compared to those formed in a one-step method. Thus, while the data in Table 16 indicates that the method of manufacturing of the composition (1-step vs. 2-step) did not appear to make a significant difference on the physical properties of the resulting composition, the data in FIG. 10 illustrates that there is a difference between the compositions. Without being bound by theory, the improvement in the extrusion pressure exhibited by the 1-step materials may be due to better incorporation of the PBE in the plastic phase of the TPV as compared to TPVs made by a two-step process.

As described and illustrated herein neat TPVs made utilizing a one-step process comprising the PBEs may exhibit improved surface quality and extrusion processability (e.g., extrusion pressure and specific throughput) as compared to TPVs that do not contain PBEs. Surprisingly, these benefits are achieved without significantly affecting the Shore A hardness or the LCR viscosity of the TPV. Further, in some embodiments, the TPVs have improved surface finish and extruder processability with only minimal impact (if any) on the compression set of the TPV.

Without being bound by theory, it is believed that the addition of the PBE allows for increasing the continuous (plastic) phase of the TPV, so that in the TPV melt state the effect of the discontinuous crosslinked EPDM particles is diluted and the tendency to melt stagnate is reduced. Further, when the TPV is in the solid state, the PBE beneficially has decreased crystallinity as compared to the thermoplastic resin such that the hardness and other physical properties of the TPV are not significantly impaired.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

All patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:
1. A method for making a thermoplastic vulcanizate, the method comprising:
   a. introducing rubber to an extrusion reactor;
   b. introducing at least 10 wt % of thermoplastic resin, based on a total weight of the thermoplastic vulcanizate, to the extrusion reactor;
   c. introducing from 1 wt % to 9 wt % of propylene-based elastomer, based on the total weight of the thermoplastic vulcanizate, to the extrusion reactor;
   d. introducing at least 5 wt % of one or more fillers, based on the total weight of the thermoplastic vulcanizate, to the extrusion reactor;
   e. introducing a first amount of process oil to the extrusion reactor at a first oil injection location;
   f. introducing curative to the extrusion reactor at a location that is downstream of the first oil injection location and that is downstream of the location at which the propylene-based elastomer is introduced to the extrusion reactor;
   g. introducing a second amount of process oil to the extrusion reactor at a second oil injection location, where the second oil injection location is downstream of the location where the curative is introduced to the extrusion reactor; and
   h. dynamically vulcanizing the rubber with the curative in the presence of the thermoplastic resin and the propylene-based elastomer to form the thermoplastic vulcanizate;
   wherein the thermoplastic vulcanizate comprises a rubber phase that is dispersed and at least partially cross-linked within a continuous thermoplastic component that comprises the thermoplastic resin and the propylene-based elastomer.

2. The method of claim 1, wherein the extrusion reactor is a multi-screw extruder.

3. The method of claim 2, wherein the extrusion reactor operates at an extrusion rate greater than about 90 kg/hr.

4. The method of claim 1, wherein 55 to 70 wt % of the total amount of oil in the thermoplastic vulcanizate is introduced at the first oil injection location.

5. The method of claim 1, wherein 25 to 40 wt % of the total amount of oil in the thermoplastic vulcanizate is introduced at the second oil injection location.

* * * * *